(12) United States Patent
Jackson et al.

(10) Patent No.: US 7,302,237 B2
(45) Date of Patent: Nov. 27, 2007

(54) WIDEBAND SIGNAL GENERATORS, MEASUREMENT DEVICES, METHODS OF SIGNAL GENERATION, AND METHODS OF SIGNAL ANALYSIS

(75) Inventors: Paul K W Jackson, Reston, VA (US); Dwaine Scott Hardy, Keedysville, MD (US)

(73) Assignee: Mercury Computer Systems, Inc., Chelmsford, MA (US)

( * ) Notice: Subject to any disclaimer, the term of this patent is extended or adjusted under 35 U.S.C. 154(b) by 289 days.

(21) Appl. No.: 10/752,085

(22) Filed: Jan. 7, 2004

(65) Prior Publication Data

US 2005/0003785 A1 Jan. 6, 2005

(51) Int. Cl.
*H04B 1/40* (2006.01)
*H04B 1/18* (2006.01)
*H04B 7/00* (2006.01)

(52) U.S. Cl. .............. 455/76; 455/165.1; 455/260; 455/255

(58) Field of Classification Search ............ 455/76, 455/165.1, 183.1, 260, 130, 313, 255, 230; 327/100, 105
See application file for complete search history.

(56) References Cited

U.S. PATENT DOCUMENTS

| | | | |
|---|---|---|---|
| 3,654,450 A | 4/1972 | Webb | |
| 4,360,832 A | 11/1982 | Rzeszewski | |
| 4,791,377 A | 12/1988 | Grandfield et al. | |
| 4,792,914 A | 12/1988 | Dartois et al. | |
| 4,800,342 A | 1/1989 | Jackson | |
| 4,815,018 A | 3/1989 | Reinhardt et al. | |
| 4,951,237 A | 8/1990 | Essenwanger | |
| 4,965,531 A | 10/1990 | Riley | |
| 4,965,533 A * | 10/1990 | Gilmore | 331/18 |
| 5,028,887 A | 7/1991 | Gilmore | |
| 5,073,869 A | 12/1991 | Bjerede | |
| 5,128,623 A | 7/1992 | Gilmore | |
| 5,146,186 A | 9/1992 | Vella | |
| 5,175,511 A | 12/1992 | Fujiwara | |
| 5,184,093 A | 2/1993 | Itoh et al. | |
| 5,291,428 A | 3/1994 | Twitchell et al. | |
| 5,301,367 A | 4/1994 | Heinonen | |
| 5,343,168 A | 8/1994 | Guthrie | |
| 5,353,311 A | 10/1994 | Hirata et al. | |

(Continued)

FOREIGN PATENT DOCUMENTS

DE 196 19 408 A1 5/1996

(Continued)

OTHER PUBLICATIONS

Matema D. M., "A lightweight fast hopping synthesizer for EHF satellite applications", IEEE, US, vol. 2, Nov. 5, 1995, pp. 752-759.

(Continued)

*Primary Examiner*—Sonny Trinh
(74) *Attorney, Agent, or Firm*—Nutter, McClennen & Fish, LLP; David J. Powsner; Joshua T. Matt

(57) ABSTRACT

A wideband signal generator according to one embodiment of the invention includes a variable frequency source and a direct digital synthesizer. Local oscillators, signal analyzers, modulators, demodulators, and other equipment including one or more such generators are also disclosed.

24 Claims, 35 Drawing Sheets

U.S. PATENT DOCUMENTS

| | | | |
|---|---|---|---|
| 5,382,913 A | 1/1995 | Carson et al. | |
| 5,467,294 A | 11/1995 | Hu | |
| 5,473,274 A | 12/1995 | Reilly et al. | |
| 5,495,202 A | 2/1996 | Hsu | |
| 5,508,659 A | 4/1996 | Brunet et al. | |
| 5,521,533 A * | 5/1996 | Swanke | 327/107 |
| 5,554,987 A * | 9/1996 | Ooga | 341/147 |
| 5,596,290 A | 1/1997 | Watkins et al. | |
| 5,598,437 A | 1/1997 | Gourse | |
| 5,598,440 A * | 1/1997 | Domagala | 375/329 |
| 5,661,424 A | 8/1997 | Tang | |
| 5,726,609 A | 3/1998 | Lindholm | |
| 5,754,437 A * | 5/1998 | Blazo | 702/75 |
| 5,801,589 A | 9/1998 | Tajima et al. | |
| 5,847,570 A | 12/1998 | Takahashi | |
| 5,857,003 A | 1/1999 | Geiger et al. | |
| 5,859,570 A * | 1/1999 | Itoh et al. | 331/18 |
| 5,878,335 A | 3/1999 | Kushner | |
| 5,886,752 A * | 3/1999 | Cross | 348/724 |
| 5,924,024 A | 7/1999 | Ikeda | |
| 5,936,438 A | 8/1999 | Whikehart | |
| 5,963,607 A | 10/1999 | Romano et al. | |
| 5,977,805 A | 11/1999 | Vergnes et al. | |
| 6,018,316 A | 1/2000 | Rudish et al. | |
| 6,028,425 A | 2/2000 | Yamashita | |
| 6,066,967 A | 5/2000 | Cahill et al. | |
| 6,081,226 A | 6/2000 | Caldwell et al. | |
| 6,154,640 A | 11/2000 | Itoh | |
| 6,160,443 A | 12/2000 | Maalej | |
| 6,198,353 B1 | 3/2001 | Janesch | |
| 6,242,899 B1 | 6/2001 | Miller | |
| 6,256,580 B1 | 7/2001 | Meis | |
| 6,281,825 B1 | 8/2001 | Lee | |
| 6,317,610 B1 | 11/2001 | Jantti | |
| 6,356,736 B2 | 3/2002 | Tomasz et al. | |
| 6,489,911 B1 | 12/2002 | O'Dwyer | |
| 6,522,176 B1 * | 2/2003 | Davis | 327/105 |
| 6,597,208 B1 | 7/2003 | Gabet et al. | |
| 6,614,813 B1 | 9/2003 | Dudley et al. | |
| 6,693,580 B1 | 2/2004 | Wehling | |
| 7,012,453 B2 * | 3/2006 | Coleman et al. | 327/113 |
| 7,023,378 B2 * | 4/2006 | Coleman et al. | 342/174 |
| 7,026,846 B1 * | 4/2006 | Huntley et al. | 327/105 |
| 2001/0015644 A1 | 8/2001 | Schwilch | |
| 2001/0017575 A1 | 8/2001 | See | |
| 2002/0036544 A1 | 3/2002 | Jackson et al. | |
| 2002/0051461 A1 | 5/2002 | Calderone | |
| 2002/0094036 A1 | 7/2002 | Jackson | |
| 2002/0094053 A1 | 7/2002 | Blazo | |
| 2002/0125957 A1 | 9/2002 | Takahashi | |
| 2002/0140512 A1 | 10/2002 | Stockton | |
| 2002/0145475 A1 | 10/2002 | Fenton et al. | |
| 2002/0191728 A1 | 12/2002 | Hafez | |
| 2003/0037081 A1 | 2/2003 | Vergel | |
| 2003/0058004 A1 | 3/2003 | Stengel et al. | |

FOREIGN PATENT DOCUMENTS

| | | |
|---|---|---|
| DE | 196 48 915 C2 | 11/1996 |
| DE | 10203378 A1 | 8/2003 |
| EP | 0338742 | 10/1989 |
| EP | 0414 445 | 2/1991 |
| EP | 0632574 A1 | 1/1995 |
| EP | 1104112 A1 | 5/2001 |
| GB | 2 373 113 A | 11/2002 |
| JP | 06209216 | 7/1994 |
| JP | 06284109 | 10/1994 |
| JP | 07-270511 | 10/1995 |
| JP | 08-162850 A | 6/1996 |
| WO | WO 91/07828 | 5/1991 |
| WO | WO 91/15056 | 10/1991 |
| WO | WO 00/13306 | 3/2000 |
| WO | WO 00/55973 | 9/2000 |
| WO | WO 01/18637 | 3/2001 |
| WO | WO-02/25807 | 3/2002 |
| WO | WO-02/091696 | 11/2002 |
| WO | WO 03/061149 | 7/2003 |

OTHER PUBLICATIONS

Ward, C. R., "A multi-mode programmable communication radio-receiver element", Proceedings of the Tactical Communications Conference, "Challenges od the 1990s", vol. 1, Apr. 24, 1990, pp. 179-204.

Skalka, R. J. et al., "A full-function tactical radio for UHF SATCOM", New York, NY, USA, IEEE, US, vol. 1, Apr. 28, 1992, pp. 211-220.

Barillet R. et al., "Limitation of the frequency stability by local oscillator phase noise: new investigations", Proceedings of the Joint Meeting of the 1999 IEEE International Frequency Control Symposium, European Frequency and Time Forum, vol. 1, Apr. 13, 1999-Apr. 16, 1999, pp. 107-110.

Stavenick, Peter, "Synthesizers Offer Submicrosecond Switching", Microwaves & RF (Jun. 2002), pp. 98-100, 102.

Mini Circuits® Document, "Mini-Circuits®: How to select a mixer" (Sep. 8, 1999), 10 pages.

Mini Circuits® Document, "Mini-Circuits®: Modern Mixer Terms Defined" (Sep. 8, 1999) 4 pages.

Mini Circuits® Document, "Low Cost, Triple Balanced, LTCC Mixer"(Dec. 4, 2001), pp. SH1-SH6.

http://www.boulder.nist.gov/timefreq/phase/100GHz.html, "100 GHz Frequency Synthesis and Phase Noise Measurements", 2 pages.

Gorin, Joe, "Detector Selection for Spectrum Analyzer Measurements", RF Test and Measurement (Feb. 2003), pp. 32, 34, 36 & 38.

Engelson, Morris, "Knowing The Signal Classes Greatly Spectrum Analysis", Electronic Design, Nov. 6, 2000, 5 pages.

http://www.educatorscomer.com/index.cgi?CONTENT_ID=2491, Agilent Technologies, "Superheterodyne Spectrum Analyzer" (Dec. 22, 2004), 3 pages.

Hayward, Wes and Terry White, "A Spectrum Analyzer for the Radio Amateur", GST (Aug. 1998), pp. 35-43.

"Hints for making Better Spectrum Analyzer Measurements," Agilent Technologies (Sep. 1, 2000), 12 pages.

http://www.nitehawk.com/rasmit/sa50.html, "Homebrew Spectrum Analyzer Project," 5 pages.

http://www.electronics-tutorials.com/test-equip/spectrum-analyzer.htm, "What is a Spectrum Analyzer?" (Dec. 2000), 4 pages.

http://www.isa-tscm.com/whyusea1.htm, "Why Use A Spectrum Analyzer?" (Jul. 26, 2002 ) 3 pages.

Gordon, Walter E., "Microwave Synthesizer Incorporates Frequency Multiplying Modules", Microwave Product Digest, Aug. 2002, pp. 14, 24, & 36.

Papay, Zs, "Numerical Distortion in Single-Tone DDS", IEEE Instrumentation and Measurement Technology Conference, Budapest, Hungary, May 21-23, 2001 (5 pages).

"Interface Control Document for Synthesizer Control", Advanced Radio Corporation ADV-3000T Synthesizer Control, pp. 1-7.

"SP8400 Programmable Divider: Product Status—Production", Zarlink: Seminconductor, http://products.zarlink.com/product_profiles/SP8400.htm, Jul. 21, 2003. (2 pages).

Kruger, Anton, "Step-Recovery Diodes", ChipCenter, http://www.chipcenter.com/eexpert/akruger055.html?Print=true, Mar. 21, 2003. (4 pages).

"Step Recovery Diodes Application Note", MicroMetrics, Inc., Application Notes, pp. 114-116.

"Step Recovery Diode Comb (Harmonic) Generators—0.1 to 26 GHz", http://www.herotek.com/datasheets/herote15.html, Mar. 21, 2003. (2 pages).

"Step Recovery Diode Comb (Harmonic) Generators—0.5 to 50 GHz", http://www.herotek.com/datasheets/herote17.html, Mar. 21, 2003. (1 page).

"Direct Digital Synthesis", Altera, http://www.altera.com/products/ip/altera/t-alt-dds.html, Mar. 10, 2003. (3 pages).

"DDS and Chirp Synthesizers—ADS63x", Meret Optical Communications, http://www.osicom.com/products_details.asp?idno=223, Mar. 10, 2003. (1 page).

Langlois J. M. P. and D. Al-Khalili, "A low power direct digital frequency synthesizer with 60 dBc spectral purity", Proceedings of the 12th ACM Symposium on Great Lakes Symposium on VLSI, http://portal.acm.org/citation.cfm?id=505342&coll=Portal&dl=ACM&CFID=28559644&CFTOKE N=86321833, New York, 2002. (3 pages).

Gaudes, C. Caballero, et al., "A Novel Frequency Synthesizer Concept for Wireless Communications", Institute of Communications Engineering, Tampere University of Technology. (3 pages).

Reed, Jeffrey H. and Brian D. Woerner, "Direct Digital Synthesis: A Tutorial", The 9th International Symposium on Presonal, Indoor, and Mobile Radio Communications, Sep. 1998, pp. 1-26.

Hollreiser, M. and L. Fanucci, "Techniques for Reducing the Generation of Spurious Frequencies in Direct Digital Synthesisers", http://esapub.esrin.esa.it/ff/pffv6n2/holv6n2.htm, Mar. 10, 2003. (9 pages).

Karlquist, Richard K., "A 3 to 30 MHz High-Resolution Synthesizer Consisting of a DDS, Divide-and-mix Modules, and a M/N Synthesizer", Hewlett-Packard Laboratories. (5 pages).

Technical Staff, "Alias and Spurios Responses in DDS Systems", Intel Corporation Application Note 102, Mar. 1990, pp. 1-4.

"Direct Digital Synthesis (DDS)", DACS for DSP Applications, pp. 4.12-4.17.

Hardy, Michael, "CIA Fund lures firms to set up shop in D.C.", Washington Business Journal, Aug. 5, 2002. (3 pages).

"Product Overview: Model ADV-3000S Wideband Digital Synthesizer", http://www.advradio.com/pages/955296/index.htm, Mar. 6, 2003. (2 pages).

Papay, Zs., "DDS Technology", http://www.hit.bme.hu/people/papay/sci/DDS/start.htm, Mar. 6, 2003. (4 pages).

Wolfson, Harry M., "A Very Small Frequency Generator System for Spread Spectrum EHF Applications", Lincoln Maboratory, Massachusetts Institute of Technology, pp. 40.6.1-40.6.5. (5 pages).

Ziornek, C.D., "Techniques in Digital Communication", ZTEC Inc. (5 pages).

"Conventional Direct Digital Synthesizer", http://www.ecdl.hut.fi/~jvan/cdds.html, Mar. 7, 2003. (2 pages).

"What is Direct Digital Synthesis", DDS Technote, http://www.srsys.com/html/body_ddstechnote.html, Mar. 7, 2003. (2 pages).

"Direct Digital Synthesizers—Overview", QUALCOMM Incorporated, ASIC Products, 1997, pp. 1-1-1-8. (8 pages).

"Technical Discussion", http://www.miteq.com/micro/rfsignalprocessing/d213b/technicaloverview/pg3.html, May 14, 2003. (2 pages).

Schweber, Bill, "Give DACs due diligence for superior DDS performance", http://www.e-insite.net/ednmag/1997/071797/15df_01.htm, Jul. 17, 1997. (11 pages).

"A Technical Tutorial on Digital Signal Synthesis", Analog Devices, Inc., 1999, pp. 1-122.

Frequencies in Direct Digital Synthesizers, http://esaspub.esrin.esa/it/pff/pffv6n2/holv6n2.htm, Mar. 10, 2003. (9 pages).

* cited by examiner

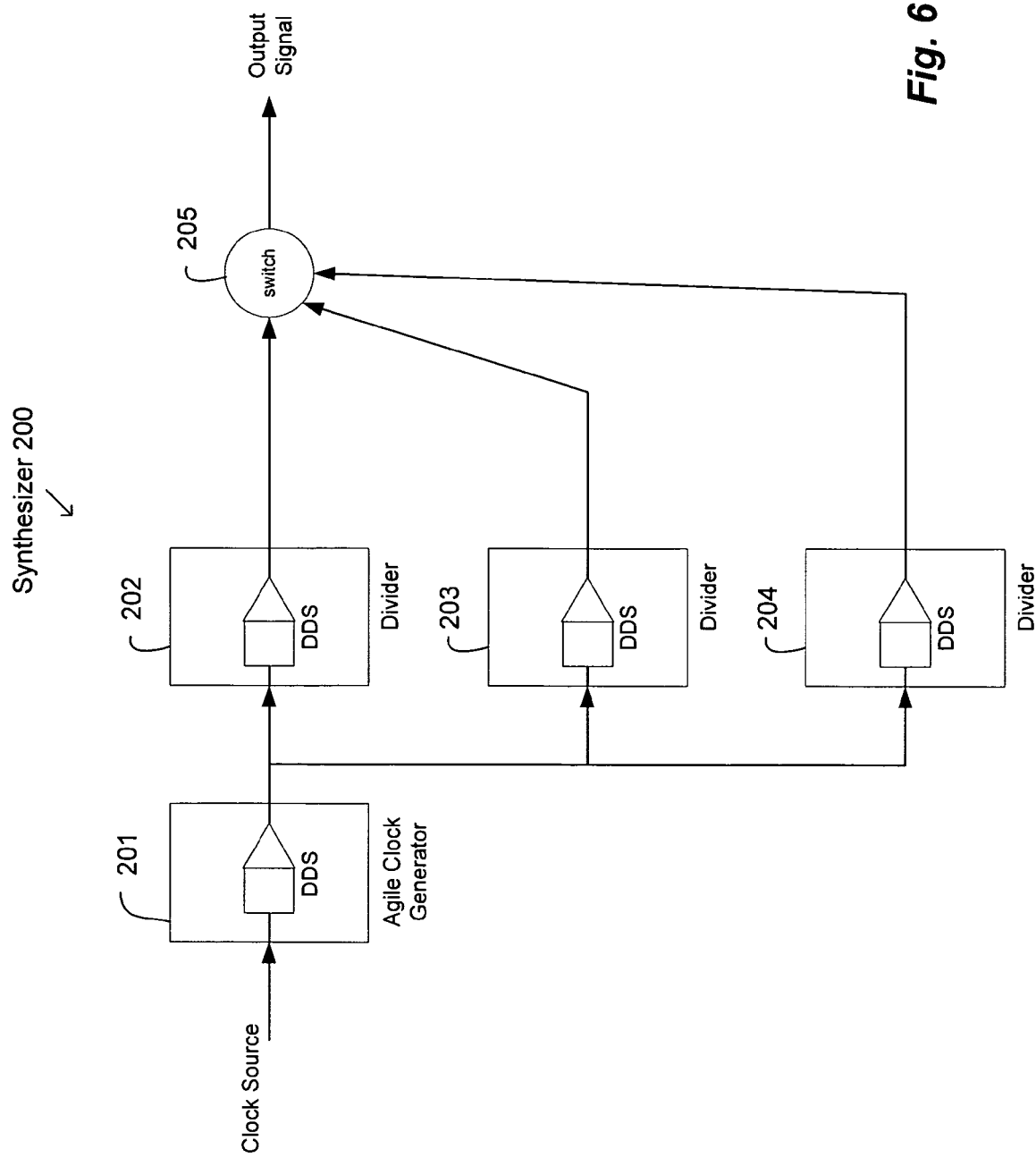

Satellite Anatomy Diagram

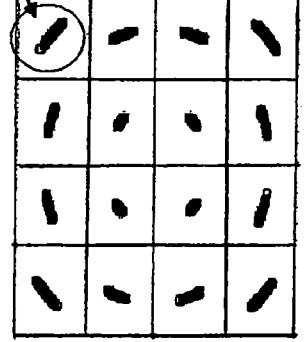
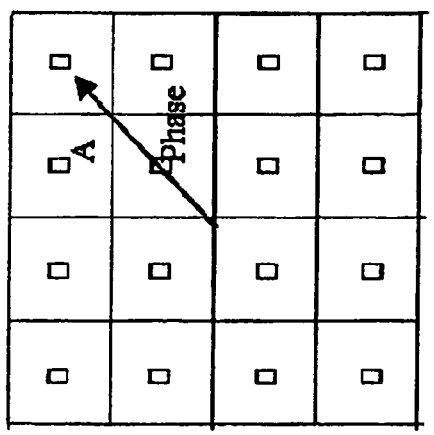
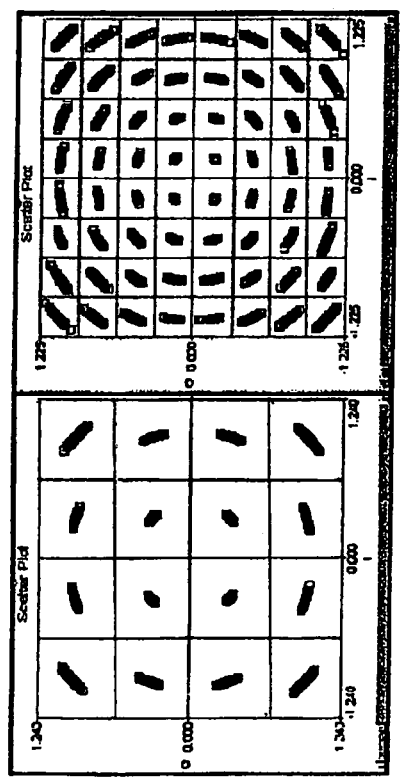
Ideal 16QAM (LEFT) VS. 16QAM W/ PHASE JITTER (ABOVE)
FIG. 14

Radar Anatomy Diagram

Divide Ratio = 2.990 (Poor Location)

Divide Ratio = 3.000 (Optimal)

Divide Ratio = 3.1000

Divide Ratio = 6.1991 (narrowband spur free location)

WIDEBAND SIGNAL GENERATORS, MEASUREMENT DEVICES, METHODS OF SIGNAL GENERATION, AND METHODS OF SIGNAL ANALYSIS

RELATED APPLICATIONS

This application claims the benefit of U.S. patent application Ser. No. 101624,900, filed Jul. 23, 2003, and of International (PCT) Patent Application No. PCT/US2003/039231 (now published as WO2005/062736 A2), filed Dec. 11, 2003 by deposit at the U.S. Patent and Trademark Office and naming as inventors P. K. W. Jackson and D. S. Hardy.

FIELD OF THE INVENTION

The present invention relates to signal generators, frequency synthesizers, devices incorporating signal generators and/or frequency synthesizers, and methods of signal generation.

BACKGROUND

Many electronics applications and systems require the use of one or more signals having particular frequencies and/or phases. For example, radio transmitters and receivers frequently employ local oscillator signals for upconversion and downconversion. Accordingly, methods and devices have been developed for generating such signals, including phase locked loop (PLL) based solutions.

Another device that may be used to generate signals is the direct digital synthesizer (DDS). Typically, a DDS receives an input clock signal and a control word. Based on the control word and possibly also on subsequent timing (Read, Write, Update control, etc.), the DDS outputs a waveform (e.g., a sine wave) having a known frequency and/or phase with respect to the input clock signal. For example, a DDS generally includes a phase accumulator to indicate a phase state of the current output sample and a lookup table to indicate an amplitude corresponding to that phase state. The control word may be loaded into a register of the DDS such as, for example, an accumulator. The DDS then determines the desired frequency and/or phase of the output signal based on the lookup table information associated with the received input control word. DDS devices available from integrated circuit suppliers include the AD98XX series products available from Analog Devices, Inc. of Norwood, Mass. Other DDS suppliers include Harris Corporation of Melbourne, Fla.; Intersil Corporation of Melbourne, Fla.; and Intel Corporation of Santa Clara, Calif.

A standard DDS may include a phase accumulator, a phase-to-amplitude converter, and a Digital to Analog Converter (DAC). The DDS core described above without the DAC may also be referred to as a Numerically Controlled Oscillator (NCO). The phase accumulator, phase-to-amplitude converter, and DAC are the standard building blocks for the DDS, although the implementation of each varies from design to design.

One such variance is the implementation of the phase-to-amplitude converter. This converter, which generally uses a look-up table stored in memory, receives the phase at a given sample and outputs a corresponding amplitude. However, in such implementations, only the most significant portion of the phase value may be used due to memory size limitations of current designs. Therefore the table truncates the X least significant bits (where X may change from design-to-design and part-to-part), using only the Y most significant bits. Additionally, the implementation of the table may change. For example, the amplitude may be repeated in 90 degree increments and only the sign of the amplitude may change according to the quadrant. Therefore many look-up tables use only 90 degrees in the look-up table along with a sign bit(s) to specify what quadrant the phase is in.

A DDS may be configured as a frequency divider. In such cases, the control word may specify a desired frequency and/or phase of the output signal (where the frequency is processed through the DDS core and any phase offset is summed in) as the ratio of the desired output signal to the input clock signal (where the output frequency is based on the accumulator value and the clock rate).

Because the DDS output is produced using a digital process, DDS based solutions may provide a significant reduction in phase noise as compared to analog based solutions. For example, analog solutions may use an error correction loop to determine the phase/frequency of the output. In such case, the transfer function that determines the extent (e.g., bandwidth) of correction is inversely proportional to the time required to correct, thereby sacrificing speed for phase noise or vice versa. Furthermore, DDS based solutions can provide fine tuning resolution of the output frequency (e.g., micro-hertz tuning resolution) as well as sub-degree phase tuning. In addition, DDS based solutions may provide such advantages as an extremely fast speed in tuning to the output frequency or phase, phase-continuous frequency switching with no over/undershoot, and little or no settling time as may occur for analog based (e.g. loop) solutions. DDS based solutions may also reduce or eliminate the need for manual system tuning and tweaking due to component aging and temperature drift, for example, that are often issues for analog based solutions.

However, DDS based solutions may require relatively high input clock speeds and may produce spurious frequency responses in which unwanted components are present in the output frequency spectrum.

One source of spurious output components (or "spurs") is phase truncation error. Phase truncation error may occur, for example, when the number of entries in the DDS output lookup table is less than the maximum number of possible amplitudes capable of being specified by the digital control word based on, for example, the length of the accumulator register in the DDS which receives the control word for decoding. For example, a DDS with a 32-bit phase accumulator is capable of distinctly specifying $2^{32}$ distinct phases. To provide corresponding amplitude entries for each of these $2^{32}$ possibilities would require a phase lookup table containing 4,294,967,296 entries, which may not be feasible to provide in a design. Therefore, the lookup table may include less than the maximum number of possible amplitudes, and the DDS may resolve or correlate the phase accumulator value resulting from an input control word to that phase which is closest to the exact value specified by the state of the phase accumulator.

Furthermore, the amplitude of the truncation error spurs may vary periodically over time based on the overflow characteristic of the phase accumulator (also known as the Grand Repetition Rate). The change in truncation error amplitude with respect to time may define a periodic waveform having a frequency spectrum of sufficiently high range that higher order harmonics of the truncation error waveform produce aliasing into the Nyquist bandwidth. Additional information regarding DDS phase truncation and other errors and spurious responses is available from industry sources including, for example, "A Technical Tutorial on Digital Signal Synthesis" (published by Analog Devices, Inc., 1999.

Spurious responses may appear at frequencies relatively close to the output frequency of a DDS. This aspect can be particularly troublesome to system designers. In narrowband applications, the DDS input clock can be set to a single frequency or a very narrow tuning band, for example, to avoid these "close in" responses. However, thus restricting the range of the input clock also limits the output signal tuning range of the DDS.

Errors in the digital-to-analog conversion (DAC) process are typically a significant source of spurious responses. Such errors may include quantization error as well as DAC nonlinearities. DAC-introduced error, which may be related to the clock and the output frequencies, is typically highly predictable.

SUMMARY

Embodiments of the present invention include systems and methods for utilizing DDS based signal generator solutions for wideband applications. Such embodiments may also provide systems and methods for reducing or avoiding spurious DDS responses by varying the clock signal input to the DDS.

At least one embodiment of a signal generator according to the present invention includes a clock generator that has a first direct digital synthesizer (DDS) configured to produce a clock signal based on a clock source signal. The signal generator further includes a clock divider that has a second DDS configured to produce a divided signal based on (1) the clock signal and (2) a control signal indicating a divide ratio. These embodiments may further include selectable filters configured to produce a filtered signal based on the divided signal. The selection among the selectable filters may be based on the control signal, a selected output frequency (e.g. as selected by a user or by a hardware or software component of an application), a frequency of the divided signal (which may be based on the selected output frequency), and/or another value based on the selected output frequency such as a divide ratio. In at least one embodiment, the number of selectable filters is four.

In at least one embodiment, the signal generator may further comprise a frequency translator configured to produce a translated signal based on the filtered signal. The translator may be, in some embodiments, a mixer receiving a local oscillator (LO) signal, a frequency doubler, or a multiplier including, for example, a step recovery diode (SRD). Use of a multiplier may result in spurious components also being translated, however.

In at least one embodiment, the clock divider may be configured to produce a divided signal having a principal frequency that is 2.5 times lower than a principal frequency of the clock signal with subsequent filtering.

Furthermore, the clock divider may include a third DDS configured to produce a second divided signal based on (1) the clock signal and (2) a second control signal indicating a second divide ratio. In such embodiments, the selection of one of multiple selectable filters may be provided based on the second control signal. In at least one embodiment, the number of selectable filters is four.

In addition, in at least one embodiment the second DDS (or third DDS) may include a table of output values and the divided signal may be determined based on the table of output values in response to (1) the clock signal and (2) a control signal indicating a divide ratio and forgoing the phase to amplitude conversion. In these embodiments, the second DDS may output changes to the divided signal at a frequency substantially equal to the frequency of the clock signal without the full phase to amplitude conversion. Because the output divided signal may be an integer or integer+/−a subset (such as, for example, 0.5) of the phase value, it may be possible to reduce the size of the lookup table.

Furthermore, in at least one embodiment the second DDS (or third DDS) may be preloaded to output the divided signal at a predefined frequency in response to receiving the clock signal (e.g. with substantially no delay).

A method of generating a signal according to another embodiment of the invention includes using a first DDS to generate a clock signal and using a second DDS to generate a signal based on the clock signal and having a frequency that is substantially equal to one-half of the clock signal. Such a method may also include providing a phase offset value to the second DDS.

A method of generating a signal according to another embodiment of the invention includes providing a first signal to a clock input of a DDS and using the DDS to generate an output signal based on the first signal and having a frequency that is substantially equal to one-half of the clock signal. Such a method may also include providing a phase offset value to the DDS.

A method of generating a signal according to another embodiment of the invention includes using a DDS to generate an output signal having a desired frequency component and a spurious frequency component, monitoring a strength of the spurious frequency component, and changing a phase offset value of the DDS based on a result of said monitoring.

Further embodiments of the invention include transmitters, receivers, transceivers, test equipment, signal analyzers, spectrum analyzers, satellite communications systems, modulators, demodulators, and radar systems that include signal generators as described herein (e.g. employed as local oscillators), methods of using such devices, methods of signal analysis, methods of modulation, and methods of demodulation.

BRIEF DESCRIPTION OF THE DRAWINGS

The invention described herein is further explained in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 illustrates an embodiment of a synthesizer including a clock generator coupled to more than one divider;

FIG. 14 is a series of scatter plot diagrams showing examples of the effects of improved phase noise in an embodiment;

DETAILED DESCRIPTION

Unless indicated otherwise, the terms "signal generator," "synthesizer," and "frequency synthesizer" are used interchangeably herein. Embodiments described as "exemplary" indicate illustrative examples only and are not necessarily preferable over any other embodiment.

Embodiments of the present invention may include a synthesizer architecture suitable for signal generation, for example, in wideband applications. In at least one embodiment, the DDS synthesizer includes a clock generator configured to provide a tunable or varying clock input to one or more other DDSs. Operation of such a device may include selecting the output frequency of the clock generator (which may also include a DDS) to reduce or prevent spurious components in the output of a subsequent DDS or DDSs. Such embodiments may be applied, for example, to produce signals over a wide frequency range.

Figure 24:
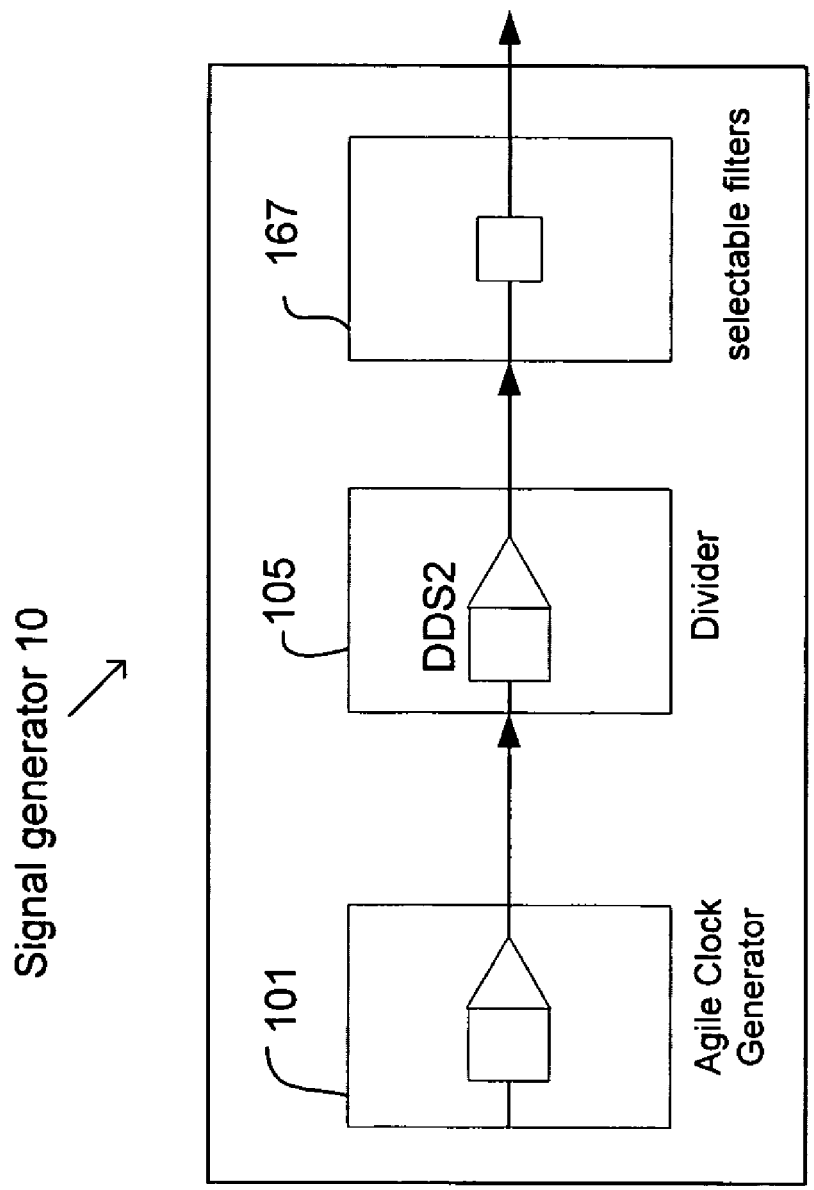
FIG. 24 shows a block diagram of a signal generator 10 according to an embodiment of the invention.

FIG. 24 shows a block diagram of a signal generator 10 according to an embodiment of the invention. Clock generator 101, which may include one or more DDSs, generates a synthesized clock signal based on a clock source signal (not shown). Divider 105, which may also include one or more DDSs, receives the synthesized clock signal (or a signal based on it) and generates a divided signal based on the synthesized clock signal and a ratio. A bank 167 of selectable filters receives the divided signal (or a signal based on it) and a selected one of the filters is applied to filter the signal to produce an output. The selection among the selectable filters is based on the ratio. Further embodiments of signal generator 10 as described herein may include components such as filters, frequency translators, switches, and/or summers in the signal paths between clock generator 101 and divider 105, between divider 105 and selectable filters 167, and/or downstream of one or more of selectable filters 167.

Figure 1:
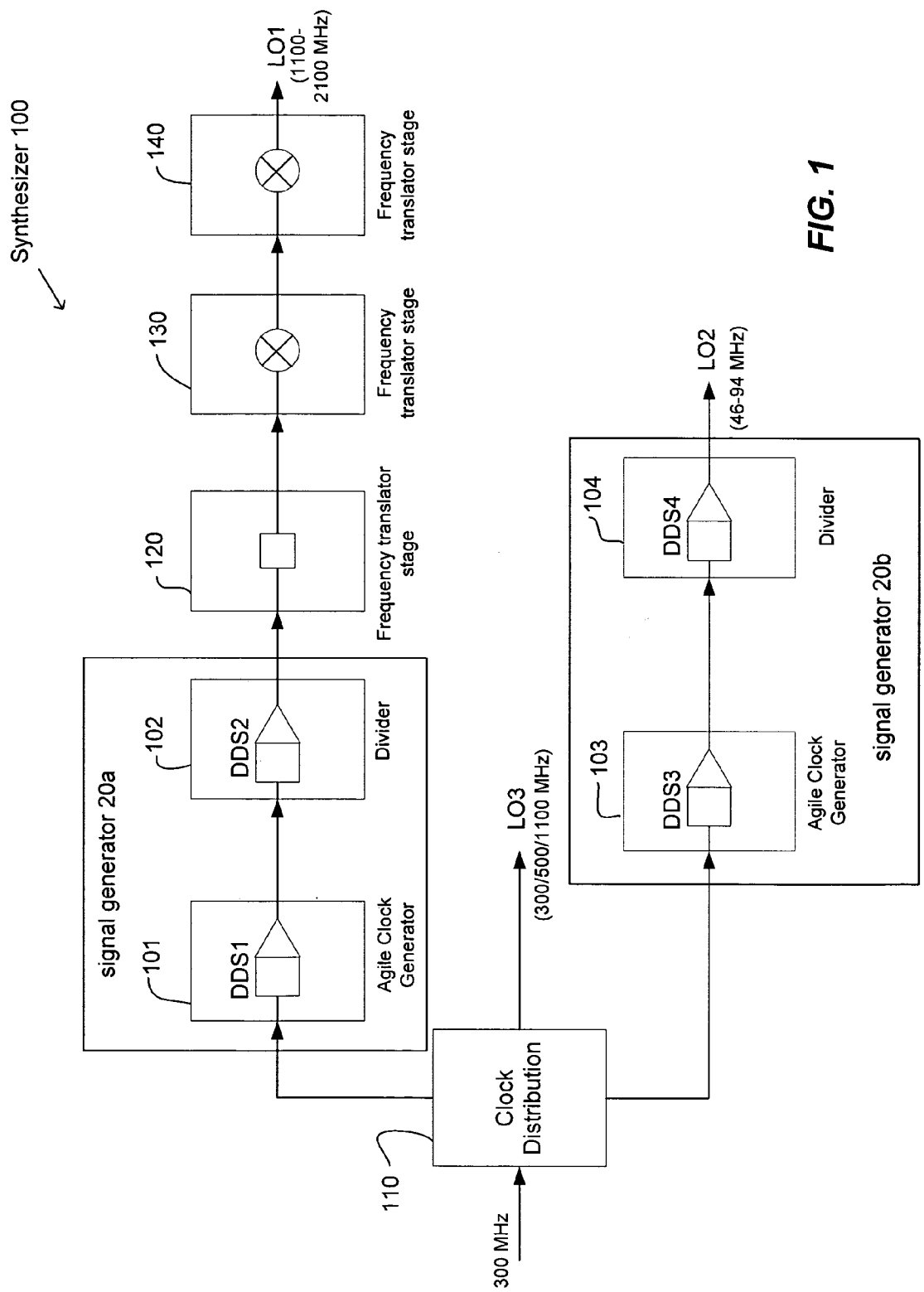
FIG. 1 is a block diagram of a frequency synthesizer 100 according to at least one embodiment.

FIG. 1 shows a functional block diagram of an synthesizer 100 that includes two implementations 20a,b of signal generator 10. Synthesizer 100 may be configured as a wideband local oscillator signal generator, for example, to include a first agile clock generator 101 configured to provide a first clock signal. In this implementation, clock generator 101 receives a first clock source signal (and possibly other signals) from a clock distribution unit 110. For example, clock distribution unit 110 may generate or receive a 300 MHz clock signal input and output a 300 MHz clock signal based on that signal to the clock generator 101. In another implementation, clock generator 101 may include an oscillator configured to generate the first clock signal or a precursor of such signal. Such an oscillator may be a crystal oscillator (e.g. a temperature-controlled crystal oscillator or TCXO) or other suitable device.

In at least one embodiment, the clock generator 101 produces a DDS clock signal input to a clock divider 102. Clock generator 101 may include a step recovery diode (SRD) and associated circuitry for clock generation (e.g. by multiplying a clock signal having a lower frequency). Clock divider 102 may be configured to output a divided signal based on the DDS clock signal input and the state of a control word.

Figure 2:
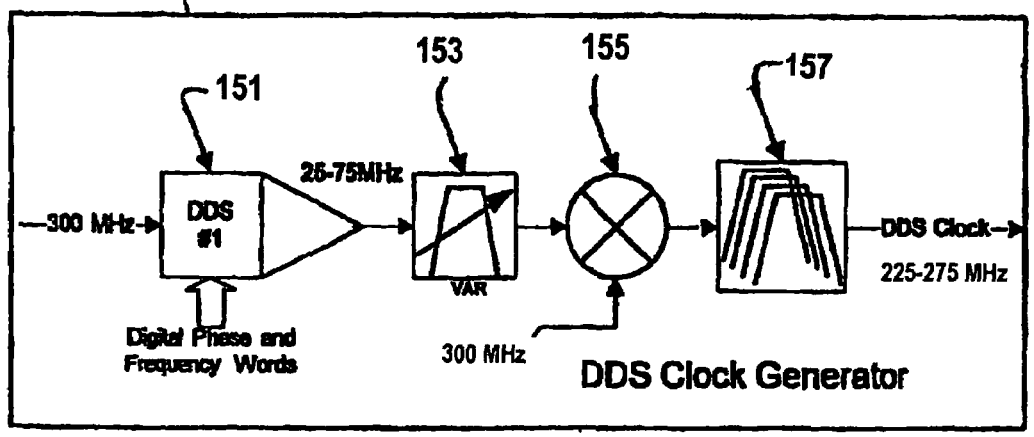
FIG. 2 is a detailed block diagram describing the clock generator in at least one embodiment.
Figure 3:
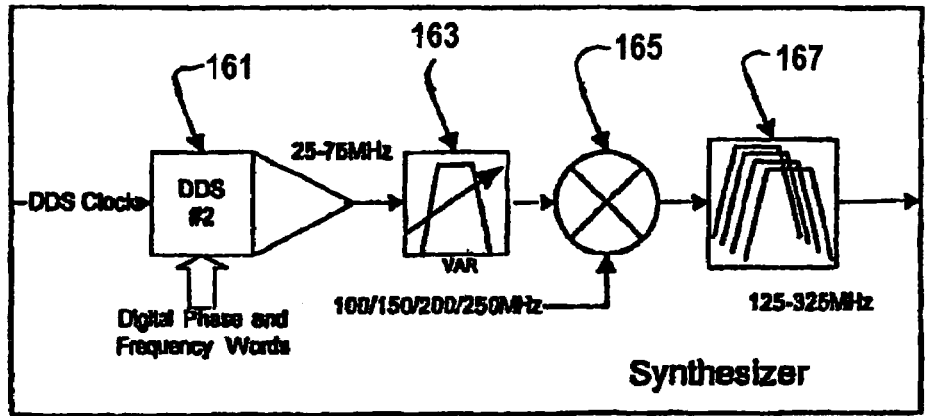
FIG. 3 is a detailed block diagram describing the clock divider in at least one embodiment.

FIGS. 2 and 3 provide additional details concerning possible implementations of clock generator 101 and clock divider 102, respectively. As shown in FIG. 2, clock generator 101 may include a DDS 151 coupled to a variable bandpass (and/or switched bandpass) filter 153, the output of which may be provided to a frequency translator 155. The variable bandpass filter 153 may remove artifacts due to the clock signal as well as other artifacts such as alias and spurious responses.

The term "frequency translator" as used herein includes devices such as frequency multipliers (e.g. circuits including SRDs) and mixers. Frequency translator 155 may be implemented as a mixer to receive a first local oscillator signal and produce an upconverted output DDS clock signal. In at least one implementation, the first local oscillator signal is derived from the same base as the clock signal provided by the clock distribution unit 110 to the DDS 151 and may even be the same signal. Furthermore, the output DDS clock signal may be implemented as a sine wave that is continuously tunable across a range (for example, to any frequency across the output band of the DDS 151). The output DDS clock signal may be filtered using one of multiple selectable bandpass filters (or switched bandpass filters, or a singular filter) 157 to produce a filtered output DDS clock signal.

As shown in FIG. 3, clock divider 102 may include a DDS 161 that receives the output DDS clock signal from clock generator 101. The DDS 161 may produce a divided signal which is provided to a variable bandpass (or switched bandpass, or singular) filter 163 coupled to an output of DDS 161. The variable bandpass filter 163 may remove artifacts due to the clock signal as well as other artifacts such as alias and spurious responses. The divided signal output by the DDS 161 may be, for example, a sine wave that is tunable over a broad frequency range.

The filtered divided signal may then be provided to a frequency translator 165 configured to produce a translated divided signal (e.g. by mixing the filtered divided signal with a second local oscillator signal). The translated (e.g. upconverted) divided signal may be filtered using one of multiple selectable bandpass filters 167 to produce a filtered upconverted divided signal. In at least one embodiment, the DDS 161 selects the particular bandpass filter 167 based on the state of the control word.

In some embodiments, the divided signal output by the clock divider 102 has a frequency at least two times but less than three times lower than the DDS clock signal received from the clock generator 101. In at least one embodiment, the divided signal has a frequency that is 2.5 times lower than the DDS clock signal. In such embodiments, it may be sufficient to provide filtering of the output only to suppress the images appearing at 0.5 and 1.5 times the output frequency. Thus, the only dividing restriction nearing an integer value of 2 is the restriction imposed by the sampling nature of the digital architecture, which may cause images to be aliased back into the bandwidth of interest.

In at least one embodiment, four has been found to be a suitable number for the set of selectable bandpass filters 157 and 167, each of which is individually selected for filtering its respective input signal. In at least one embodiment, each of the filters of the set of filters 157 and 167 may be constructed using discrete components, which may be separate components for each filter. Alternatively, four has been found to be a suitable number for the set of selectable bandpass filters 153 and 163, if selectable input frequencies to the agile clock generator are used. Use of selectable input frequencies to the agile clock generator 101 may be further advantageous in increasing the spurs-free bandwidth of the output of the clock generator 101.

Each of the filters comprising the set of filters 157 and 167, as well as any other set of selectable bandpass filters herein, may have a different bandpass frequency range as well as a smaller or larger relative bandpass range (i.e., the size of the filter's range calculated as the difference between the high frequency cutoff and the low frequency cutoff for the filter) compared to other filters in the set. Depending on the requirements and/or tolerances of the particular application or design, adjacent passbands may overlap or be nonoverlapping. One possible arrangements for the passbands of the filters in a set is as a series of octaves.

For example, filter set 157 may have four filters and be implemented to pass the band 50-200 MHz. If the individual filters were implemented to have passbands of equal width, then the respective passbands might be centered at 50, 100, 150, and 200 MHz, each filter passing a band +/−25 MHz from the center frequency. Such a distribution would not be suitable for removing images at 0.5× and 1.5× from an output frequency of 50 MHz, however, as the 25 MHz and 75 MHz images would lie within (or at least at the edge of) the passband of the 50-MHz filter. Therefore, another distribution of the center frequencies and/or passbands of the filters might be more desirable. For example, the same center frequencies may be used, with the filters having progressively wider passbands as the center frequency increases. Alternatively, the filters may have center frequencies that are non-uniformly distributed. For example, an octave or semi-octave distribution (e.g. 50-70-100-140) may be used instead, with each filter having a passband slightly more narrow than the center frequency.

The DDSs 151 and 161 may receive one or more control words which cause the DDSs to produce output signals having particular frequencies and phases. For example, the control words may include digital phase and frequency information. The control words may be stored by the DDSs 151 and 161 in, e.g., an accumulator or other such register for decoding and processing.

In at least one embodiment, an accumulator of a DDS used in the embodiment (e.g. DDS 151 or 161) may add the digital information contained in the received control words to the binary value already in the accumulator (e.g. using modulo-2 addition) to form a new frequency/phase index value. The DDS may then use the newly formed frequency/phase index value to determine from a phase lookup table the frequency and phase of the signal to output from the DDS.

In particular, in at least one embodiment one or both DDSs is phase continuous. That is, the DDS accumulates from the current value in the phase accumulator when a new accumulator value is written to the accumulator. When a new frequency value (phase accumulator value) is written, it accumulates or adds to the last value in the accumulator unless the DDS is purposely reset to a phase accumulator value of zero.

In an embodiment, the clock divider 102 may be pre-loaded to output the divided signal at a predefined frequency in response to receiving the DDS clock signal input.

The following Table 1 provides a particular example of frequency planning, including control information that may be used to control particular implementations of DDSs 151 ("DDS1") and 161 ("DDS2") to perform signal synthesis operations as described herein. In at least one embodiment, control logic is used to control the functioning of the DDSs 151 and 161 to produce particular divided signals according to Table 1. For example, one or more such control words may be loaded into a control register of a DDS. This logic may be implemented using, for example, a gate-based logic design embodied in a Field Programmable Gate Array (FPGA), an Application Specific Integrated Circuit (ASIC), a series of discrete components, and/or processor-executable instructions stored in a memory (which may be a Read-Only Memory (ROM), Programmable ROM (PROM), Erasable PROM (EPROM), nonvolatile random-access memory (NVRAM), flash memory, or any variation thereof).

In this example, the output of DDS1 151 is upconverted by 300 MHz before input to DDS2 161. The DDS2 161 applies a selected divide ratio, and its output signal may be doubled to obtain the desired output signal. Given a selected output frequency, a known range of acceptable divide ratios, and a known set of available upconversion options, control logic may be implemented to select the appropriate output frequency for DDS1 151:

TABLE 1

DDS1 & DDS2 CONTROL

| DDS1 RANGE (MHz) | DDS1 OUT (MHz) | DDS2 DIVIDE RATIO | DDS2 OUT (MHz) | DDS2 DOUBLED ? | FREQ OUT (MHz) |
|---|---|---|---|---|---|
| 50-81.5 | (DDS2 * 3.5) − 300 | 3.5 | 100-109 | NO | 100-109 |
| 27-93 | (DDS2 * 3.0) − 300 | 3.0 | 109-131 | NO | 109-131 |
| 27.5-75 | (DDS2 * 2.5) − 300 | 2.5 | 131-150 | NO | 131-150 |
| 75-90 | (DDS2 * 5.0) − 300 | 5.0 | 75-78 | YES | 150-156 |
| 51-69 | (DDS2 * 4.5) − 300 | 4.5 | 78-82 | YES | 156-164 |
| 28-92 | (DDS2 * 4.0) − 300 | 4.0 | 82-98 | YES | 164-196 |
| 43-81.5 | (DDS2 * 3.5) − 300 | 3.5 | 98-109 | YES | 196-218 |
| 27-93 | (DDS2 * 3.0) − 300 | 3.0 | 109-131 | YES | 218-262 |
| 27.5-75 | (DDS2 * 2.5) − 300 | 2.5 | 131-150 | YES | 262-300 |

In at least one embodiment, the clock divider 102 includes a look-up table of amplitude values that may be used to directly specify the divided signal output (e.g. without converting phase values). In response to the control word, for example, the outputted value may be determined based on the table of amplitude values. In at least one embodiment, the clock divider 102 outputs new values of the divided signal at a frequency substantially equal to the frequency of the DDS clock signal without the full phase-to-amplitude conversion. The lookup table of DDS 151 for the clock generator 101 may also contain entries previously determined to reduce or prevent the generation of spurious components in the frequency spectrum of the DDS clock signal produced by the clock generator 101.

In at least one embodiment, spurious content is reduced by tuning the Divider DDS to integer or integer+/−0.X values, where X is a digit. In particular, X may be equal to 5. However, other values for X are possible (e.g. 1). Alternatively, X may be a real number. This selection may have the effect of causing the spurious responses (e.g. images as generated by DAC errors such as quantization and nonlinearity) to be masked under the fundamental frequency (output frequency). For exact integer divide values, all spurious content due to DAC error may fall under the fundamental frequency. For integer values +/−0.X, some spurious content may fall under the fundamental, with the closest remaining spurious content falling at a frequency equal to the output frequency +/−(0.X*output frequency). It is then possible to determine the number of filters and their rejection needs based on the spur-free ranges of the output frequency.

Figure 3A:
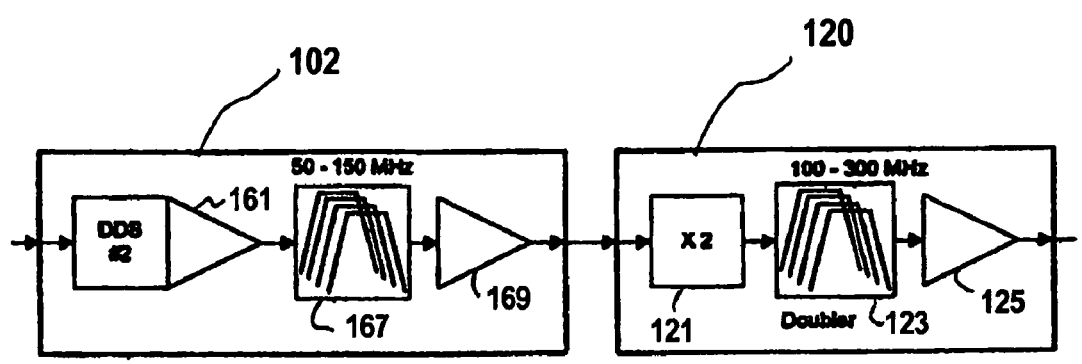
FIG. 3*a* is a detailed block diagram of another embodiment of the clock divider and a frequency multiplier.

FIG. 3*a* shows a further embodiment of clock divider 102 and frequency translator stage 120. As shown in this figure, the clock divider 102 may include a DDS 161 that receives the clock signal output by the clock generator 101. The DDS 161 may produce a divided signal which is filtered using one of multiple selectable bandpass filters 167 to produce a filtered divided signal. In at least one embodiment, the DDS 161 may select the particular bandpass filter 167 based on the state of the control word. For example, the divided signal output by the DDS 161 may be a sine wave tunable over a broad frequency range.

The filtered divided signal may then be provided through a driver 169 to a frequency translator stage 120 where the filtered divided signal is translated to produce a translated divided signal. Frequency translator 121 may be implemented as a multiplier, for example, using a comb generator including a snap or step recovery diode. Alternatively, frequency translator 121 may include a mixer configured as a frequency doubler (or "dedicated multiplier"), with the input signal being coupled to both of the RF and LO inputs of the mixer.

The translated divided signal may be filtered using one of multiple selectable bandpass filters 123 to produce a filtered translated divided signal. For example, the number of selectable bandpass filters may be four. In at least one embodiment, the DDS 161 may select the particular bandpass filter 123 based on the state of the control word. The filtered translated divided signal may then be provided through a driver 125 (e.g. a buffer, amplifier, or impedance-matching network) to one or more frequency translators to produce other frequencies of interest.

Figure 4:
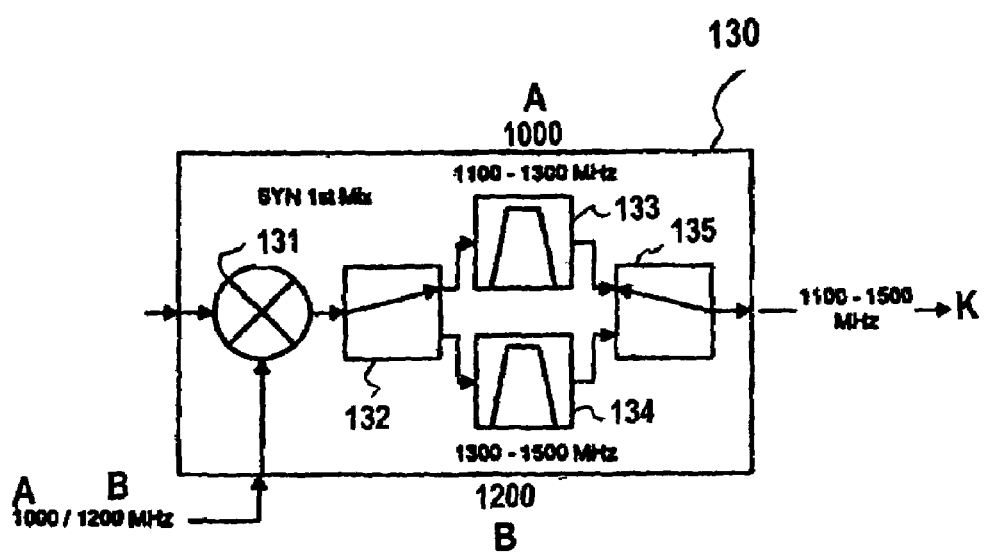
FIG. 4 is a detailed block diagram of an embodiment of the first synthesizer stage.

FIG. 4 shows a detailed functional block diagram of an embodiment of frequency translator stage 130. As shown in this figure, the frequency translator stage 130 that outputs a first portion of the first local oscillator signal may include a frequency translator 131 (which may be coupled to the frequency translator stage 120), the output of which is coupled through switches 132 and 135 to one or more selectable bandpass filters 133 and 134. In at least one embodiment, the frequency translator stage 130 selects the bandpass filter 133 or 134 based on the frequency of the received filtered translated divided signal. In an embodiment, the number of selectable bandpass filters in this stage is two, although more or fewer filters may be used as appropriate.

The bandpass filters 133 and 134 are selected based on the desired output frequency of the stage or an intermediate frequency needed to perform a conversion to the desired output frequency. For example, in a particular implementation as shown in FIG. 4, either the 1100-1300 MHz bandpass filter 133 or the 1300-1500 MHz bandpass filter 134 is selected based on the desired output frequency for the first frequency translator stage 130, which ranges from 1100 MHz to 1500 MHz. As shown in FIG. 4, an intermediate frequency (IF) input of 100-300 MHz from the preceding stage 120 may be mixed with either 1000 MHz or 1200 MHz to produce the above stated output.

In at least one embodiment, control logic may be used to select the filter 133 or 134 based on the desired output frequency. The control logic may be implemented using, for example, but not limited to, an FPGA, ASIC, ROM device, or software, as described above. The control logic may first determine the output frequency to be provided, and then determine the local oscillator frequency needed to upconvert to the final output. In an embodiment, if the desired output frequency is between 1100-1300 MHz, then the 1000 MHz local oscillator signal is selected and mixed with 100-300 MHz using the frequency translator 131 to yield 1100-1300 MHz, as shown in FIG. 4. On the other hand, if the desired output frequency is from >1300-1500 MHz, then the 1200 MHz local oscillator signal is selected and the 1300-1500 MHz filter 134 is selected. In at least one embodiment, selecting the LO signal and the filter may be accomplished with the same control signal. Additional details regarding the control logic and control flow are described herein with respect to FIG. 16.

Figure 5:
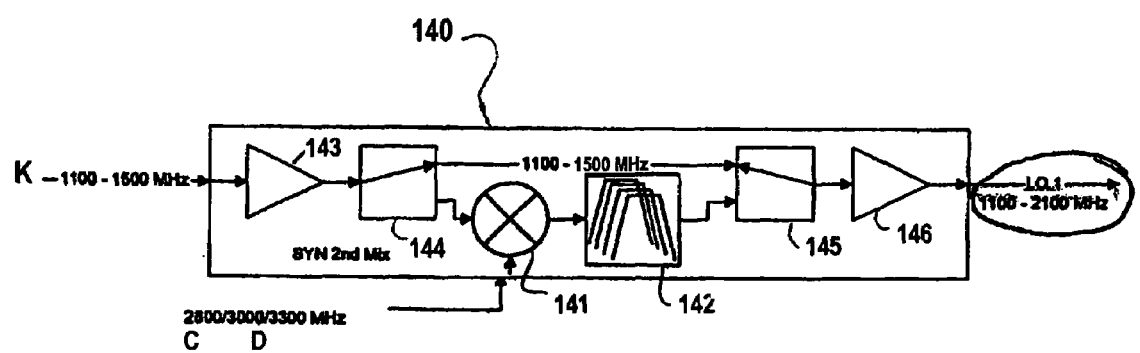
FIG. 5 is a detailed block diagram of an embodiment of the second synthesizer stage.

FIG. 5 shows a detailed functional block diagram of an embodiment of frequency translator stage 140. As shown in this figure, frequency translator stage 140 may include a pair of switches 144 and 145 which, in a first position, configures the frequency translator stage 140 to provide the received signal to a frequency translator 141 (e.g. a mixer) which may be coupled to one of multiple selectable bandpass filters 142 to produce a filtered signal. In at least one embodiment, the frequency translator stage 140 may select the particular bandpass filter 142 based on the final output frequency required at the output of the frequency translator stage 140. In a second position, the switches 144 and 145 configure the frequency translator stage 140 to output the signal received by the stage. In either case, the second stage signal through switch 145 is provided through the driver 146 as the first local oscillator final output signal. In the particular implementation shown in FIGS. 1 and 5, the first local oscillator signal output by this stage has a frequency of between 1100 MHz and 2100 MHz.

In at least one embodiment, the switch settings for filtering and upconversion selection or bypass are selected by control logic based on a stage output frequency, the desired final output frequency of the first local oscillator LO1 (e.g., 1100-2100 MHz), or an intermediate frequency used for upconversion to produce one of these. A filter may be selected that has a passband within the range of the output frequency and that attenuates the unwanted terms, such as the local oscillator input in the upconversion case. If the stage 140 is not configured for upconversion (e.g., the output frequency is between 1100-1500 MHz), then the translator 141 is bypassed and the output frequency from the previous stage (e.g., frequency translator stage 130 in FIG. 4) is used.

In at least one embodiment as illustrated in FIG. 1, the synthesizer 100 may further include a second signal generator (i.e. a second clock generator 103 coupled to a second divider 104) configured to produce a second local oscillator signal. The clock signal received from the clock distribution unit 110 by the second clock generator 103 may have the same frequency as the clock signal received by the first clock generator 101; alternatively, clock distribution unit 110 may provide a signal having a different frequency to generator 103. The structure and operation of the second clock generator 103 and the second divider 104 may be substantially the same as described above for the first clock generator 101 and the first divider 102 in FIGS. 1-3a. The second local oscillator signal may have, for example, a frequency between 48 MHz and 94 MHz. In order to generate higher local oscillator frequencies, the output of the second divider 104 may be coupled to an upconverter and/or one or more synthesizer stages as described above.

In at least one embodiment, the synthesizer 100 may provide a third local oscillator signal. The third local oscillator signal may have, for example, a frequency of one of 300 MHz, 500 MHz or 1100 MHz. In an embodiment, the clock distribution unit 110 may include one or more step recovery diodes (SRDs) configured to generate the third local oscillator signal.

Alternatively, a varying tunable clock source may be constructed using other than DDS methods and devices to provide the clock for the second or subsequent DDS(s). An example of such a varying, tunable clock source is a phase-locked loop. While a phase-locked loop may be slower to tune, such a device may provide lower power consumption (down to milliwatts) and/or a smaller size (due e.g. to reduced filtering requirements) in comparison to a DDS. In such embodiments, the variable-frequency clock signal is received by the clock divider(s), which may be as described earlier with respect to FIGS. 1-3a.

In a further embodiment, a synthesizer 200 may include a clock generator 201 coupled to more than one divider (for example, dividers 202-204 as shown in FIG. 6). In at least one embodiment, one or more of dividers 202-204 are implemented using DDSs. Multiple clock dividers may be used, for example, to reduce or eliminate the time it takes to load a new division ratio or control word into a DDS divider. In one implementation, one or more of the clock dividers 202-204 are preconfigured (i.e. before being selected into the signal path) with a particular division ratio, control word, and/or output frequency/phase in order to achieve even faster switching time. In an exemplary application, such an architecture may be used to "ping-pong" between or "hop" among different frequencies very rapidly.

For example, one or more of clock dividers 202-204 may include multiple registers for preloading of different predefined divider values, with the divider capable of selecting one of the preloaded divider values in response to a signal provided by control logic external to the divider at a rate faster than the time required to load each divider individually. The control signal may be provided upon or prior to the divider being selected into the signal path.

Alternatively, each of the multiple dividers 202-204 may be preconfigured or preloaded with a single respective divider value, and then each divider may be individually selected (e.g. by switch 205) at a rate faster than the time required to load each divider individually, in order to achieve a very fast tuning speed. In at least one embodiment, the dividers 202-204 may have a parallel loading control word register (as opposed to a register that is loaded serially).

It should be noted that although FIG. 6 shows three dividers 202-204, any number of dividers or divider DDSs may be used in various embodiments. The architecture may also be implemented to include a switch between the clock generator 201 and the dividers 202-204.

In an alternative implementation, a divider chip may have multiple (e.g. four or eight) different pin-selectable profiles, each including its own control word or divide ratio, such that fast frequency switching may be achieved during operation, as described above with respect to FIG. 6. In one such implementation, such a divider chip may provide phase-continuous switching between two different frequencies. Alternatively, the architecture of FIG. 6 may be implemented using a summer in place of (or in addition to) switch 205, such that outputs from multiple dividers (e.g. 202-204) may be combined to provide a modulated output signal or a desired waveform shape.

Furthermore, alternatively at least one of the dividers 202-204 may be a non-DDS based frequency divider. For example, such a frequency divider may be constructed as or including a logic chip (e.g. TTL, ECL) or using discrete components, or may otherwise include an integrated circuit capable of outputting a divided frequency. Alternatively, such a divider may produce a divided signal according to one of several different divide ratios in response to a selection signal. Such embodiments may offer a reduced set of available divide ratios, such that the clock generator 201 may be required in certain applications to have a frequency range that is greater than embodiments in which at least one of the dividers 202-204 is implemented using a DDS.

Figure 7A:
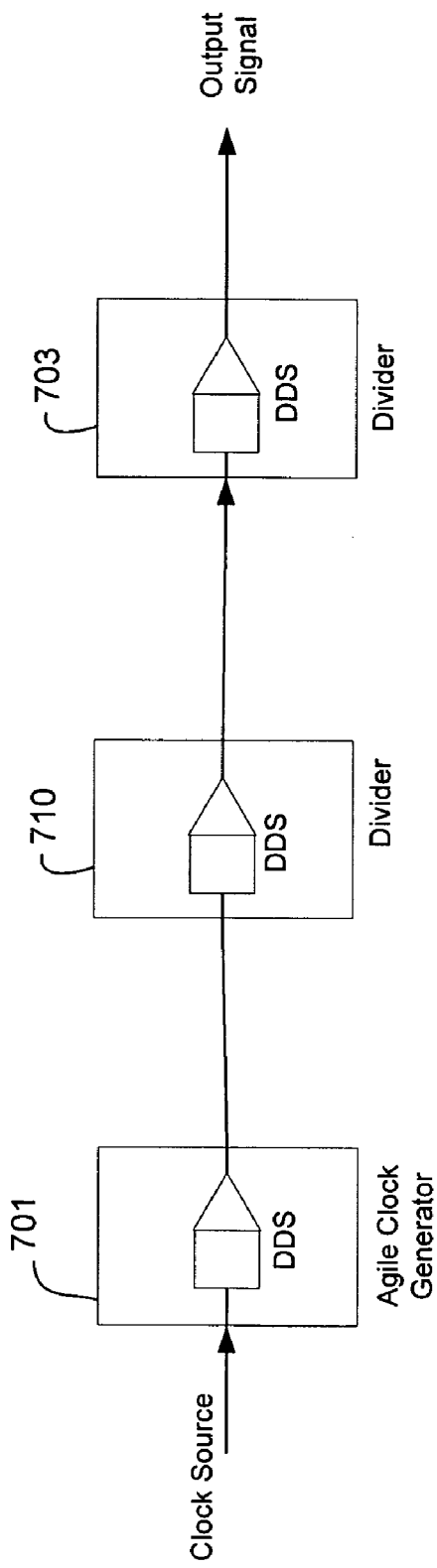
FIG. 7A is a block diagram of another embodiment of a synthesizer.

As shown in FIG. 7A, a synthesizer 700 according to another embodiment may include a clock generator 701 coupled to a first divider stage 710, the output of which is in turn coupled to a second divider stage 703. In such embodiments, at least one or all of the clock generator 701, first divider stage 710, and second divider stage 703 may be implemented using DDSs. For example the clock generator 701 may comprise a first DDS, which may be coupled to a second DDS implementing first divider stage 710, which may be coupled to a third DDS implementing second divider stage 703. The third DDS or second stage divider may, for example, substantially replicate the second DDS or divider in the embodiments described above.

Figure 7B:
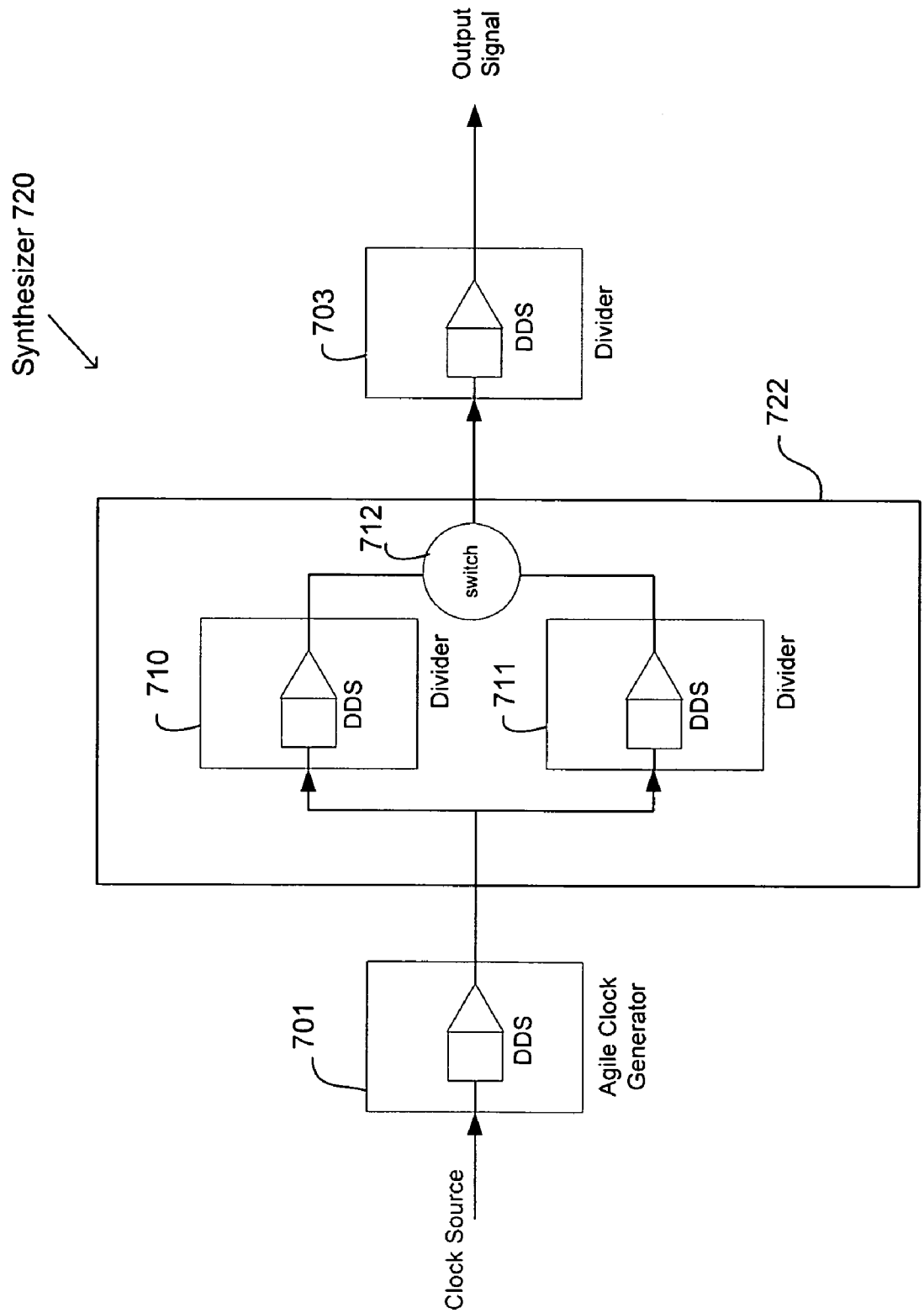
FIG. 7B is a block diagram of another embodiment of a synthesizer.

Advantages of using a third DDS serially coupled to the output of the second DDS may include finer tuning resolution (e.g., micro-hertz resolution) and/or further spurious component suppression. Furthermore, a first DDS (e.g., agile clock or clock generator DDS) having increased tuning resolution but reduced spurious performance may be used. In such embodiments, the spurious components produced by the first DDS (e.g., agile clock generator DDS) may be reduced by, for example, 20 log [(second DDS divide value)×(third DDS divide value)]. Thus, the addition of a third DDS may further reduce spurious responses created by the first DDS (e.g. agile clock generator) while providing finer tuning resolution. As in other embodiments, one or more of the DDSs may be preloaded for rapid frequency switching. Furthermore, as shown in FIG. 7B, a first divider stage 722 may be implemented to include more than one divider, such as the dividers 710 and 711. Such dividers may have outputs that are selectable (e.g. via switch 712) or combinable (e.g. to obtain modulated signals or other waveforms).

Figure 23:
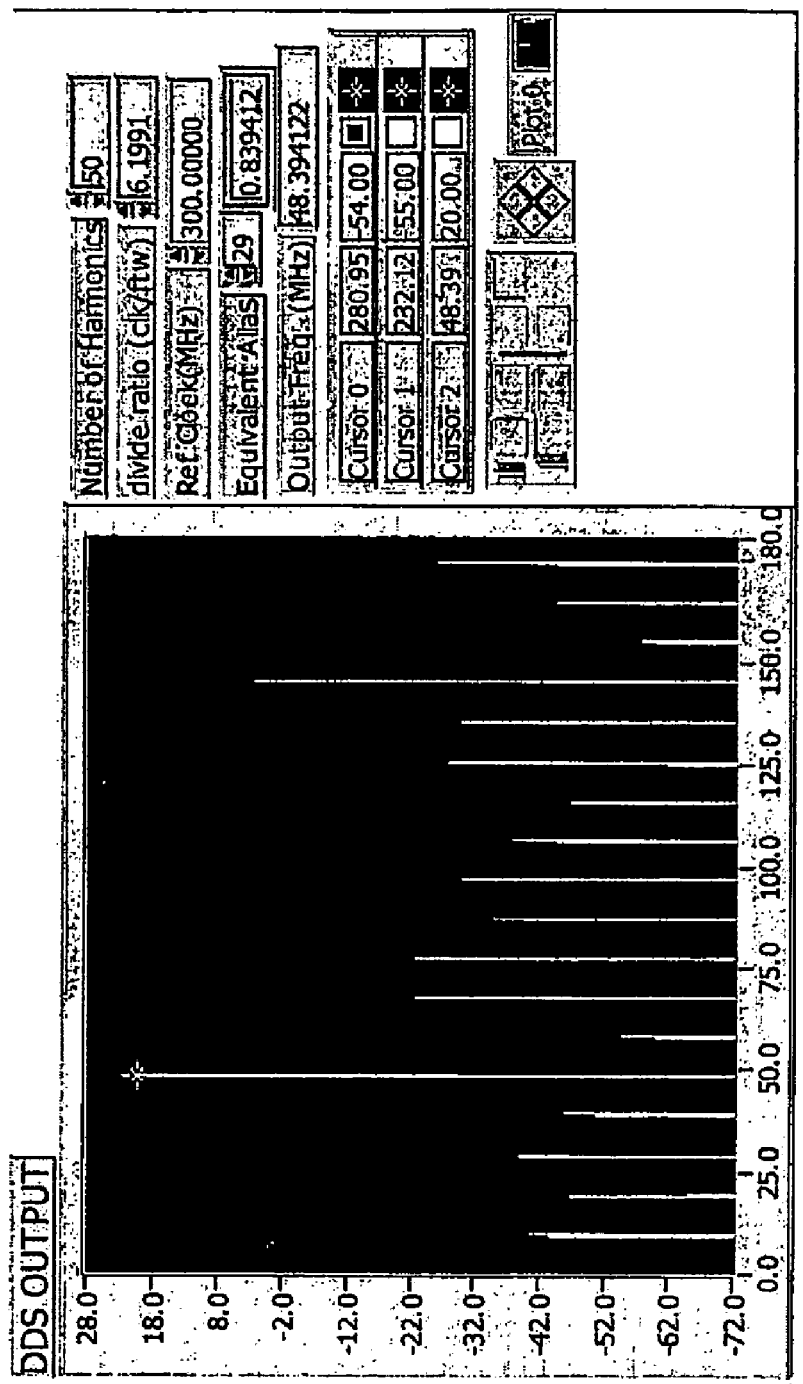
FIG. 23 shows a theoretical plot of the output signal produced by at least one embodiment having a divide ratio of 6.1991.

Regarding the clock divider 102, in at least one embodiment the DDS 161 may include a table of amplitude values to be output directly to a DAC at the rate of the input clock. Such an architecture bypasses the phase-to-amplitude conversion of current DDS architectures and may thus eliminate the need for a control word input. The table of amplitude values may be small (i.e., implemented only for integer or integer +/−0.5 ratios), such that the control word may be replaced by a signal to specify the integer (+/−0.5) ratio to be applied. In particular, such an embodiment may use ratios such as, for example, integer values +/−0.5 and/or integer values +/−0.1,0.2,0.3 or 0.4. Other acceptable solutions may include non-integer ratios of the divider DDS that have been found to provide wide bands free of spurious responses (e.g., as shown in FIG. 23). This approach is flexible to respond to particular requirements such as application bandwidth, spurious-free dynamic range, size requirements, etc.

In an embodiment, the synthesizers described above may be implemented using an integrated circuit device as a programmable divider chip DDS for use in signal generation. The chip may be programmed by sending it a particular divide ratio indicative of a corresponding sine or cosine value to use for each clock cycle. The output may be a sine wave; however, other waveforms are possible. Such a programmable divider chip may be designed for particular applications, such as, for example, applications that may use dual DDS configurations, and therefore utilize a simplified or streamlined design. In the case of the Dual DDS Synthesizer, one DDS may be used to clock a second DDS operable to function with only specific divide ratios for particular spectral purity concerns.

As discussed above, dual DDS synthesizers may be implemented to have the advantage of reducing spurs. Spurious responses is one characteristic of previous DDS architectures that has limited the widespread use of DDSs, particularly for wideband applications. At predictable intervals of the clock as it relates to the tuned output frequencies, the DDS has many close-in spurious responses. In narrowband systems, the clock is set at a single frequency to avoid these close-in responses, but this also limits the tuning range. Consequently, these spurious responses may prohibit the use of existing DDS architectures in wideband systems.

In at least one embodiment of the present invention, the first DDS provides a tunable clock for the second DDS, which allows the input clock to the second DDS to be tuned as necessary to mitigate the inherent spurious regions of the second DDS. This configuration eliminates and/or significantly reduces close-in spurious responses to utilize the desired benefits of the DDS, which include excellent phase noise and fast tuning speed. Because the cleanest output spectrum is obtained at integer and half-integer ratios, a DDS chip dedicated to these division ratios may be optimized for that function.

A further embodiment of the invention includes a programmable divider chip. Such a DDS synthesizer chip configured specifically as a divider DDS may be utilized in a variety of wideband applications where fast tuning and low phase noise characteristics are desired. These applications are not limited to but may include signal surveillance, electronic warfare, test equipment, transmitters, radar and data communications. Particular advantages of a divider DDS (as compared to, e.g., analog designs) may include simpler design, faster design, smaller tuning word, lower spurious responses, higher fidelity and lower phase jitter.

Figure 8A:
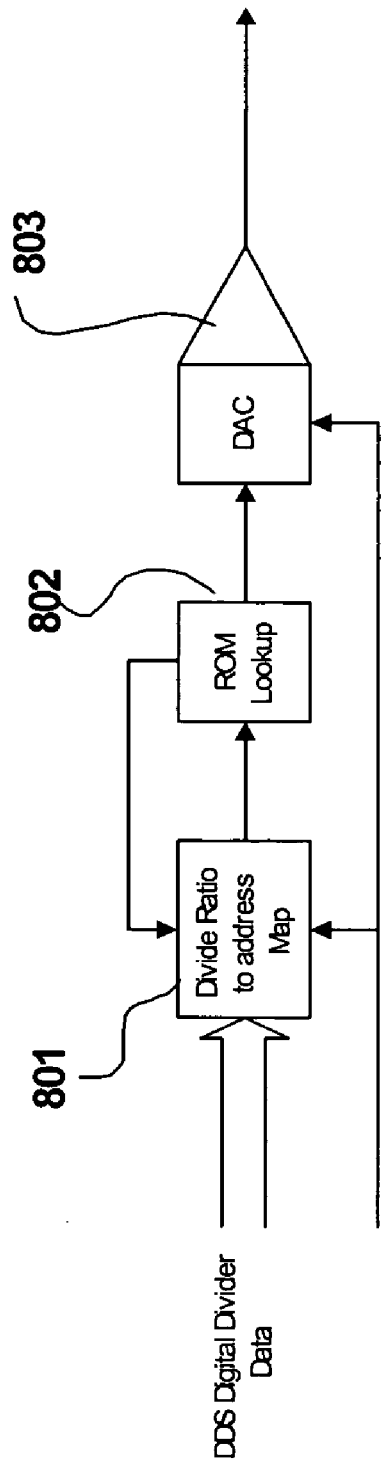
FIG. 8a is a block diagram of an embodiment of a programmable divider chip.

As shown in FIG. 8a, a programmable divider chip according to an embodiment of the invention may include three sections: a divide-ratio-to-table-address mapping section 801, a lookup table (e.g. sine and/or cosine) 802, and a digital-to-analog converter (DAC) section 803. The divide-ratio-to-address mapping section 801, which outputs a sequence of addresses for lookup table 802 according to an indicated divide ratio, may be implemented in several different ways, with selected divide ratios (e.g. all or part of the series of 2.5, 3, 3.5, 4, 4.5, . . . , 100) being supported. In the case of divide by 4, for example, mapping section 801 may indicate the address in lookup table 802 for the sine or cosine value for every 90° (or 0°, 90°, 180°and 270°), to be output to DAC 803, at a rate of one address/angle for every clock cycle. Thus one complete cycle of the divide by four output may be produced in four clock cycles. In the case of divide by 2.5, mapping section 801 may indicate the address for the sine value for 0°, 144°, 288°, 432°, and 576°, to be output to DAC 803 at the same rate. In this case, two complete cycles of the divide by 2.5 output may be produced in five clock cycles. Operations for other divide ratios may be inferred from this logic. Such a chip may also include selectable (e.g. pin-selectable) profiles as described herein.

Figure 8B:
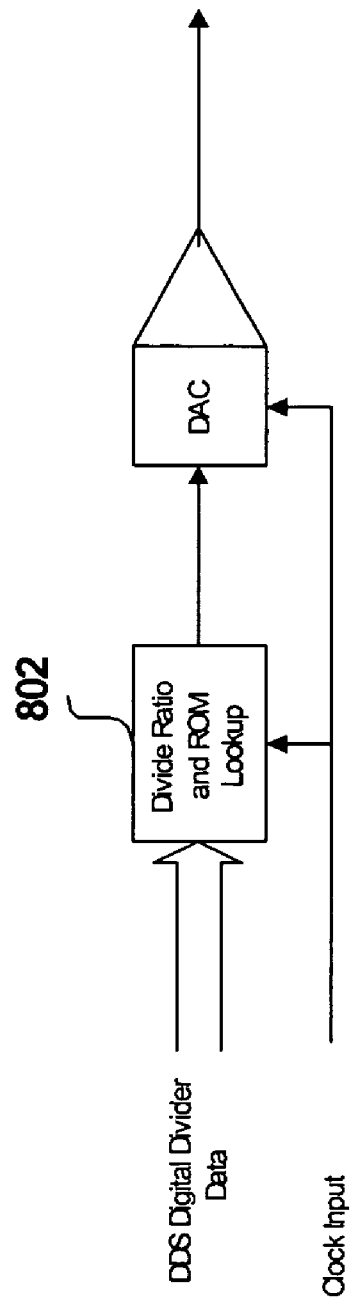
FIG. 8b is another block diagram of an embodiment of a programmable divider chip.

Such embodiments may provide a sine or cosine wave output; however, other embodiments of this basic structure are possible. One example, as shown in FIG. 8b, may include having the divide ratio to ROM lookup as one function 804. Another example is a lookup table based on a non-sinusoidal waveform (e.g. a triangle, sawtooth, or other waveforms).

Table 2 below lists some examples of incremental phase values that may be used to produce certain divider ratios.

TABLE 2

| Divider Ratio | Phase Increment (Degrees) |
| --- | --- |
| 13 | 27.69230769 |
| 12.5 | 28.8 |
| 12 | 30 |
| 11.5 | 31.30434783 |
| 11 | 32.72727273 |
| 10.5 | 34.28571429 |
| 10 | 36 |
| 9.5 | 37.89473684 |
| 9 | 40 |
| 8.5 | 42.35294118 |
| 8 | 45 |
| 7.5 | 48 |
| 7 | 51.42857143 |
| 6.5 | 55.38461538 |
| 6 | 60 |
| 5.5 | 65.45454545 |
| 5 | 72 |
| 4.5 | 80 |
| 4 | 90 |
| 3.5 | 102.8571429 |
| 3 | 120 |
| 2.5 | 144 |

As may be realized by reviewing the phase increment numbers, many values may be reused. For example, divide by 12 would have 12 values every 30 degrees and would encompass all 6 values of a divide by 6 which would have values every 60 degrees. A reuse of such numbers, and resultant reduction of the size of the lookup, allows simplification of the DDS to be realized in implementation.

Use of a DDS at a divide ratio of 2 (i.e. the Nyquist frequency) is not currently known. One possible reason is that a DDS may exhibit a decrease in output signal strength of up to 20 dB or more at an integer ratio of 2 as compared to output signal strength at higher divide ratios.

Figure 25:
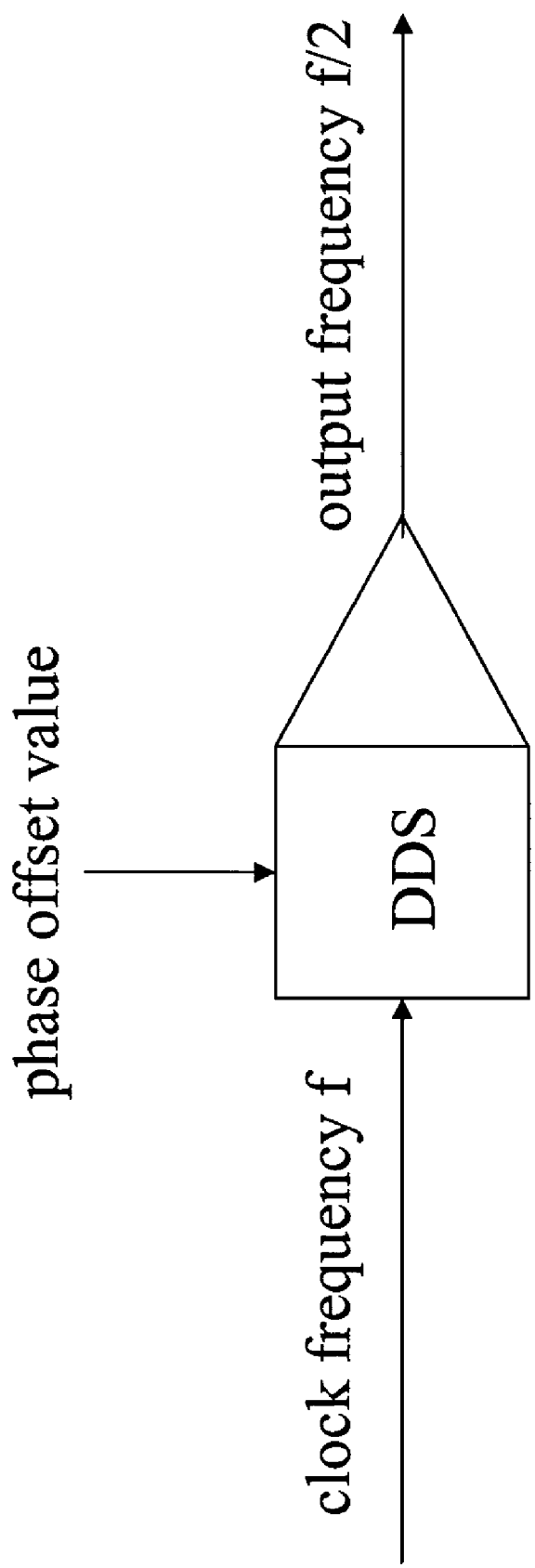
FIG. 25 shows a block diagram of a DDS having a divide ratio of 2.

Some DDSs, such as a DDS in the Analog Devices series 98XX, include a provision for adding a phase offset value to the phase value that is output by the phase accumulator (e.g. before digital-to-analog conversion). The inventors have discovered that by selecting a phase offset of 90 degrees (or 270 degrees), an output signal strength may be achieved at an integer ratio of 2 that is comparable to results at higher divide ratios (see, e.g., FIG. 25).

Such a technique may be used to particular advantage with a DDS driven by a variable-frequency clock (e.g. a PLL or another DDS), as described herein. In one such application, the divider DDS is configured with a divide ratio of 2 and a phase offset of 90 degrees. The clocking PLL or DDS may be used to provide frequency variability and/or wideband operation, while the divider DDS may be used to provide a phase-continuous and/or relatively spurious-free output at half of the clocking frequency. It may be determined that a different phase offset value provides similar advantages with other DDS models.

Figure 26:
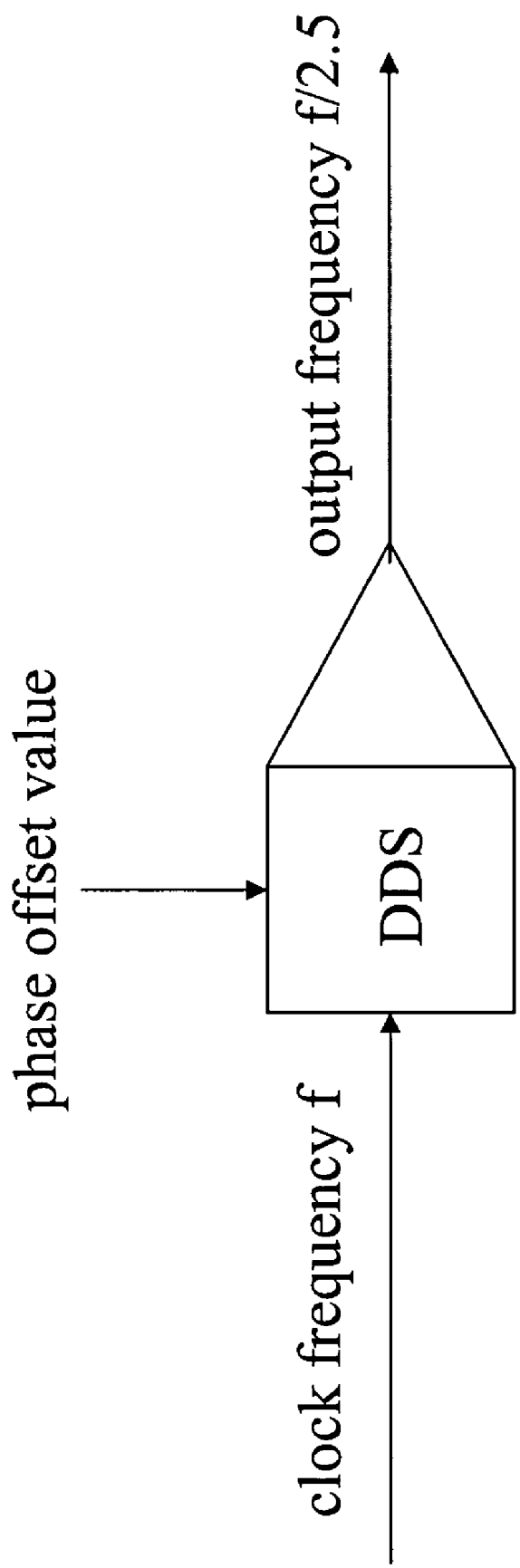
FIG. 26 shows a block diagram of a DDS having a divide ratio of 2.5.

Adjustment of a phase offset value of a DDS may also be used in conjunction with divide ratios of X.5, where X is an integer greater than or equal to 2 (see, e.g., FIG. 26). In a method according to another embodiment of the invention, a phase offset value is selected to provide decreased spurious signal strength and/or increased output signal strength.

As mentioned above, DAC nonlinearity may give rise to spurious content. DAC nonlinearities are typically greater at higher frequencies. One reason for this effect may be that outputs at lower divide ratios are converted using fewer data points than outputs at higher divide ratios. Possibly because of this effect, operation of a DDS at a divide ratio of 2.5 is currently unknown. Filtering and other techniques that may be used to enable such operation are described herein.

Figure 21:
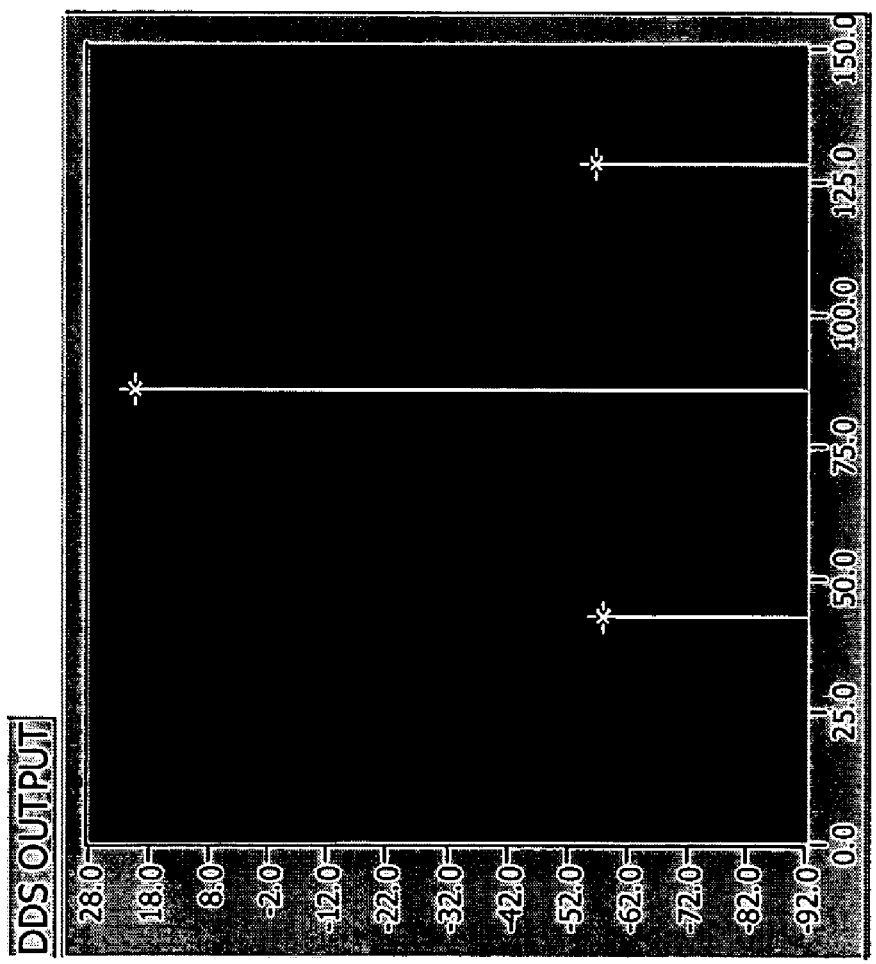
FIG. 21 shows a theoretical plot of the output signal produced by at least one embodiment having a divide ratio of 2.5000.

As noted herein, a DDS operated at a divide ratio of X.5 (where X is an integer greater than or equal to 2) may be expected to have spurious outputs at 0.5 and 1.5 times the output frequency (see, e.g., FIG. 21). By changing or selecting a phase offset value of the DDS, the strength of one or both of these spurs may be reduced.

Such a method may be further applied, e.g., to simplify a filtering task. For example, a filter may reduce the strength of a spur resulting from one clock frequency, but may not have a sufficient effect on the strength of a spur resulting from another clock frequency to meet a particular design specification. By reducing the strength of the spur as described above in at least the second case, it may be possible to meet the specification by using the same filter in that case, which may avoid a need to add another filter to the system. A method as described herein may also be used with a DDS operated at a divide ratio other than X.5.

Figure 27:
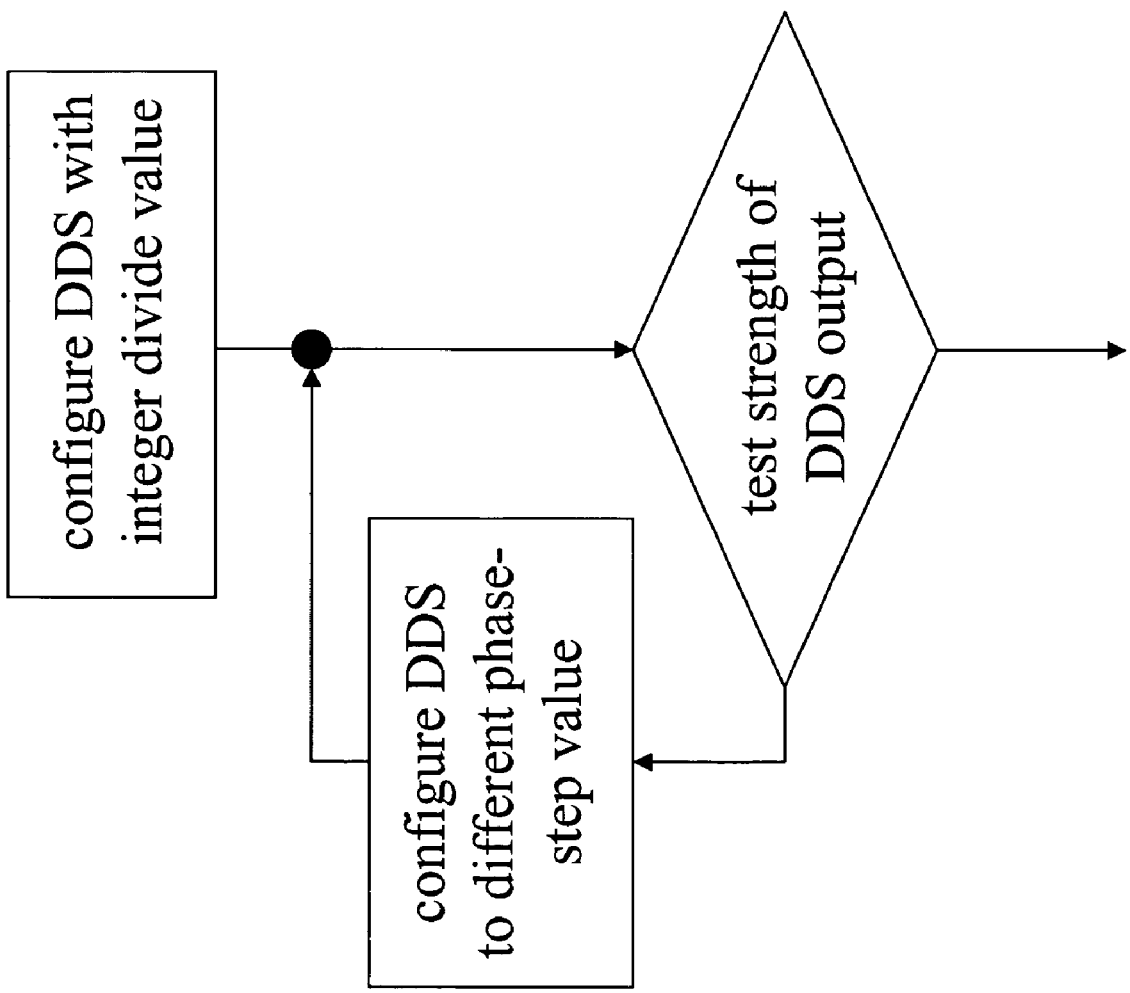
FIG. 27 shows a flowchart of a method according to an embodiment of the invention.

In a case where a phase offset value is changed or selected for a DDS to be operated at a divide ratio of X.5 (where X is an integer greater than or equal to 2), it may be possible that a suitable phase offset value (i.e. a value that results in a desired or acceptable reduction of spur strength and/or a desired or acceptable increase in desired signal strength) will change over time. For example, such a value may change based on effects of temperature, capacitance, frequency, device aging, etc. Therefore, it may be desirable to monitor a strength of one or more spurious components of the output signal of a DDS, and to change or select a phase offset value of the DDS based on a result of the monitoring (see, e.g., FIG. 27). Such a method may also be used with a DDS operated at a divide ratio other than X.5. Additionally, such a method may be used to increase a strength of the desired signal, either with or without reducing a strength of a spur.

Figure 28:
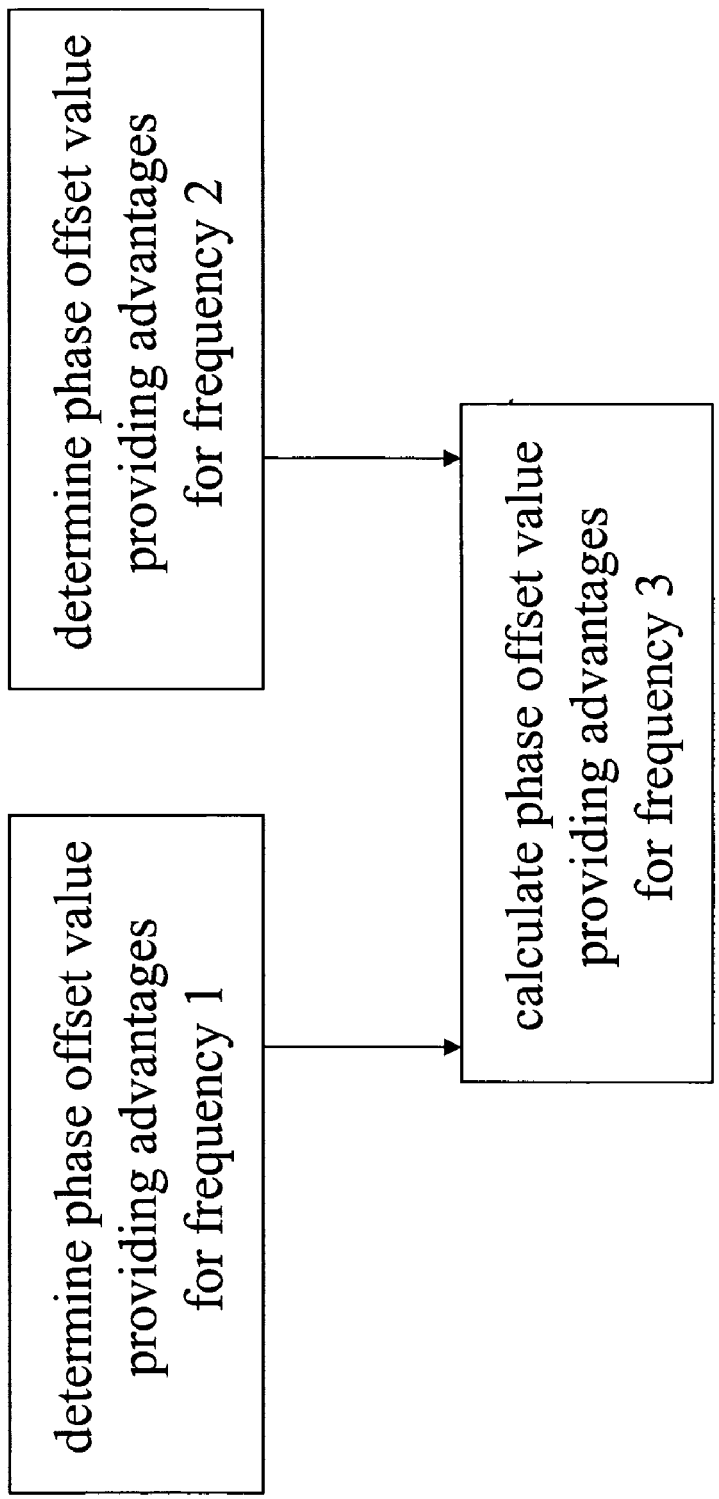
FIG. 28 shows a flowchart of a method according to an embodiment of the invention.

It may be possible to obtain information from one or more DDSs that may be used to change or select a phase offset value to produce a desired output for a different DDS of the same model number, a different DDSs from the same batch, etc. at least with respect to operation at the same frequency, at the same divide ratio, and or in the same application. For example, it is possible that an optimum or otherwise desirable phase offset value may depend on one or more particular propagation paths (which may be internal and/or external to the DDS), and that information regarding a relation between the value and the path(s) may be obtained and applied to the use of other DDSs. For example, it may be possible to use information relating to measurements at two or more different clock and/or output frequencies to calculate a phase offset value having advantages at another frequency (see, e.g., FIG. 28). Particular methods of characterization, interpolation, etc. as are known in the art may be applied in a method according to such an embodiment of the invention.

As the description herein demonstrates, embodiments of the present invention may be used for applications where one or more ultra-clean, fast tuning frequency sources are desired. Examples include, but are not limited to, a local oscillator in frequency conversion, complex modulation, and transmission and test & measurement applications. In general, the present invention may also be used for applications previously implementing a phase locked loop (PLL). Particular applications are described below with respect to FIGS. 9-16.

Figure 9:
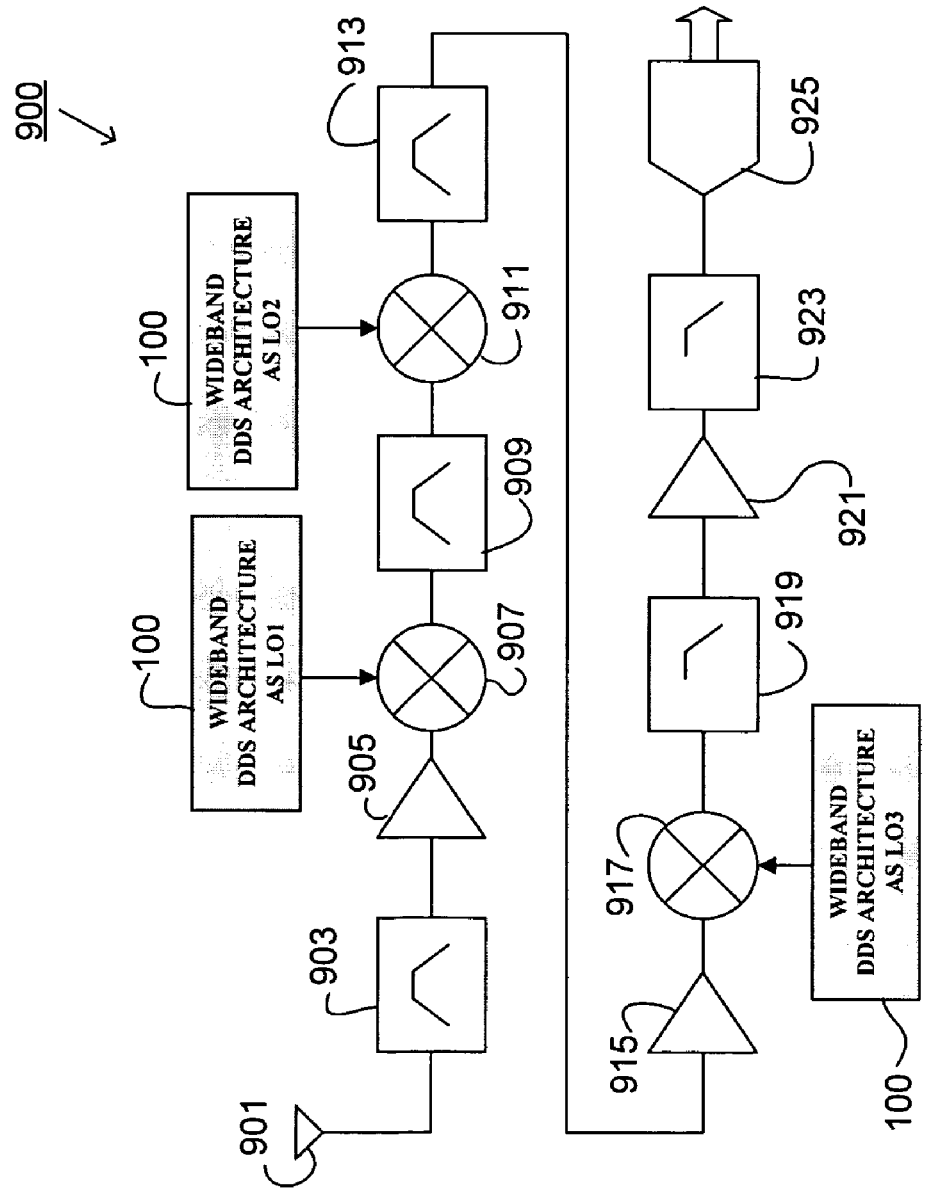
FIG. 9 is a block diagram of a fast tuning, high spectral purity tuner/receiver according to an embodiment.

FIG. 9 is a block diagram of a fast tuning, high spectral purity tuner/receiver 900 according to an embodiment. In particular, FIG. 9 illustrates an embodiment of a tuner/receiver designed for fast tuning speed and high spectral purity (phase noise and spur free dynamic range (SFDR)). Applications for such an embodiment may include Signal Intelligence (SIGINT) and Electronic Intelligence (ELINT) signal collection and analysis. In at least one embodiment, the receiver/tuner 900 may include a radio frequency (RF) antenna 901 coupled to a receive band filter 903, the output of which is fed through a low noise amplifier 905 to a first frequency translator 907 to produce a first intermediate frequency ($IF_1$). The output of frequency translator 907 is coupled through a bandpass filter 909 to a second frequency translator 911 that produces a second IF ($IF_2$). The output of the second frequency translator 911 may be fed through a bandpass filter 913 and an amplifier or signal conditioner 915 to a third frequency translator 917 to recover the detected digital signal. The output of frequency translator 917 may be coupled through a first low pass filter 919, an amplifier/signal conditioner 921, and a second low pass filter 923 to a DAC 925 to reconstruct the analog signal corresponding to the detected digital signal. In such embodiments, the tuning speed and spectral purity of a receiver may be determined by its synthesizer (LO1, LO2, and LO3 inputs to frequency translators 907, 909 and 917, respectively, in the particular implementation shown in FIG. 9). The phase noise, SFDR and tuning speed of embodiments of the present invention are well-suited for such applications. In particular, any one or all of LO1, LO2 and LO3 may be implemented using embodiments of a signal generator or synthesizer as described herein (e.g. including one or more implementations of signal generator 10). Alternatively, one or both of LO2 and LO3 may be implemented using other solutions such as PLL-based or SRD-based signal generators.

Figure 10:
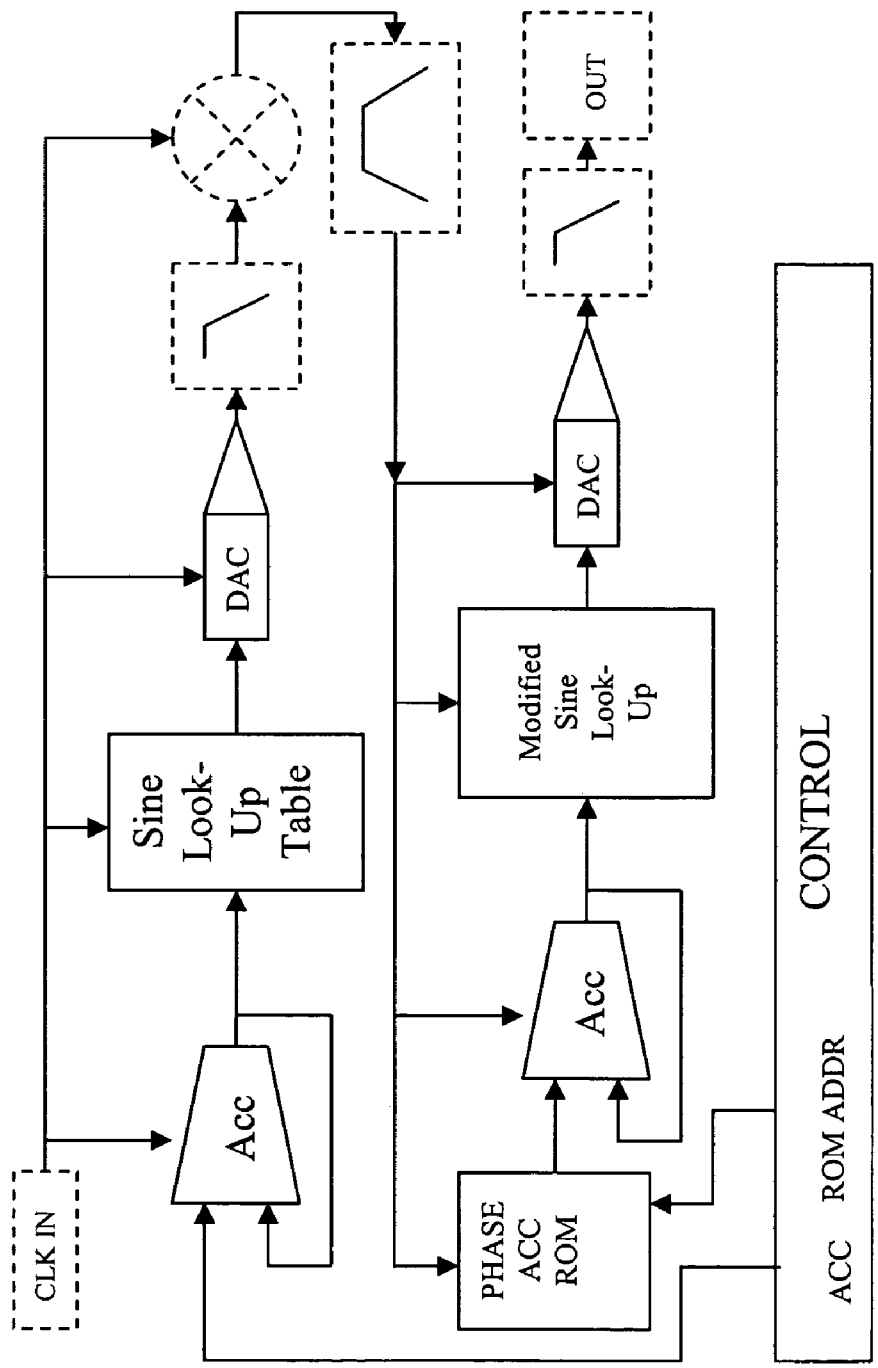
FIG. 10 is a block diagram of a DDS chip/chipsets according to an embodiment.

FIG. 10 is a block diagram of a DDS chip/chipsets according to an embodiment (e.g., "DDS on a chip"). New mixed-signal foundry processes may be used to lend this architecture to a chip or chipset solution with a limited number of external components. The bandwidths of the chip or chipset may provide for simplicity of the DDS chips with vastly improved wideband SFDR (for example, 85-90 dBc). The bandwidth of the architecture according to embodiments of the present invention will continue to increase with the speed of digital and DAC architecture.

In FIG. 10, the modified sine look-up table and phase accumulator ROM would accommodate phase accumulator and look-up values for optimally tuned spots for DDS#2 described elsewhere in this document. For certain applications, those optimal spots are integer divide ratios and integer +/−0.5 divide ratios. Using only these values corresponding to these "optimal spots" reduces the size of the phase accumulator ROM and the sine lookup table (ROM).

As denoted in FIG. 10, filter and frequency translator components may, in some embodiments, be provided external to the DDS integrated circuit.

At least some of the signal generators and methods of signal generation as disclosed herein may be applied to use in test and measurement equipment. For example, further embodiments of the invention include signal analyzers and methods of signal analysis.

Figure 11:
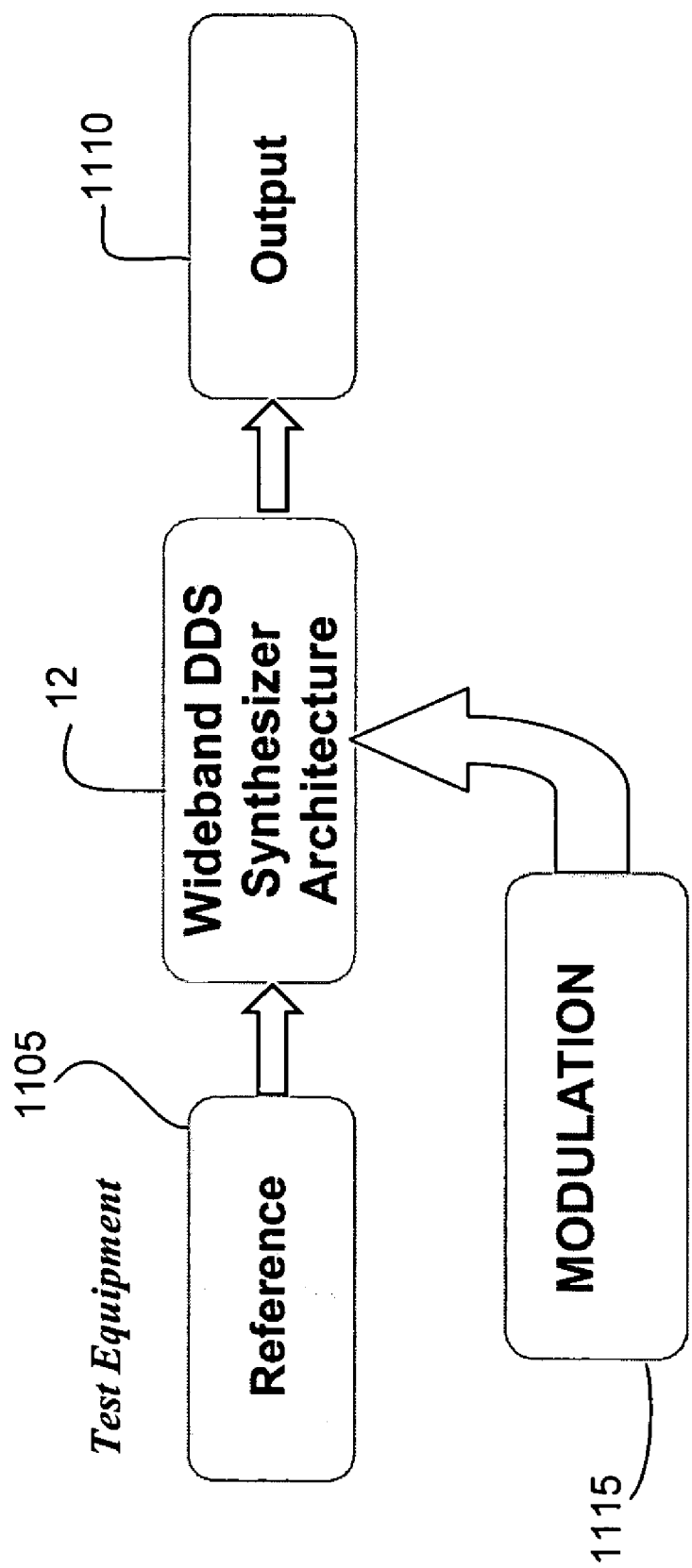
FIG. 11 is an illustrative information flow diagram for a test and measurement signal generator/spectrum analyzer front end according to an embodiment.

FIG. 11 is an illustrative information flow diagram for a test and measurement signal generator/spectrum analyzer front end according to an embodiment. In particular, embodiments of the present invention possess characteristics necessary for use in test and measurement equipment, including, but not limited to, excellent phase noise and SFDR with modulation capabilities. The test and measurement signal generator front end may include, for example, a reference signal generator 1105 and a wideband signal generator 12 in communication with the reference signal generator 1105. The wideband signal generator 12 may be implemented to include one or more implementations of signal generator 10 as described herein. The architecture would also be beneficial in the RF front ends of devices such as spectrum analyzers, improving the overall performance of the equipment.

A spectrum analyzer may include a radio-frequency receiver and a display configured to present a graphical representation of the spectrum of an input signal. For example, a spectrum receiver may include a tunable receiver with a visual display arranged to indicate a strength of the input signal within a bandwidth relative to the tuned frequency. In one mode of operation, the receiver is rapidly tuned ("swept") across a frequency range (e.g. a user-selected span), such that a representation of the relative strengths of the input signal at various points across the frequency range is displayed. The receiver may tune across the span continuously or at a discrete number of points (e.g. on the order of 100 or 400 points per sweep), which points may be uniformly distributed across the frequency range (i.e. equidistant) and/or may be distributed nonuniformly or according to a decade, octave, logarithmic, or other distribution.

Figure 11A:
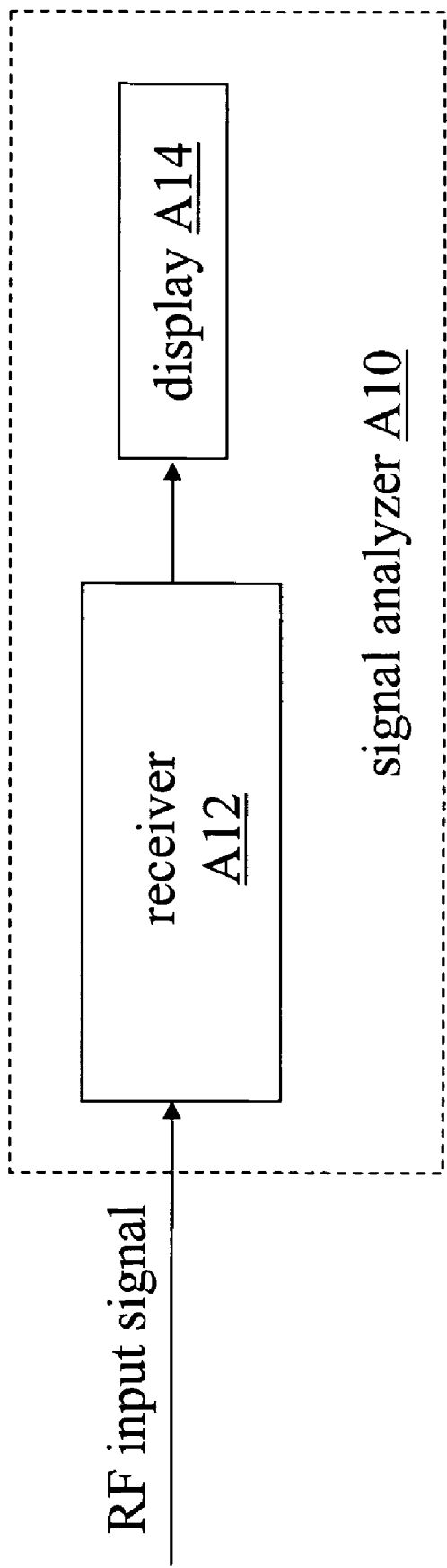
FIG. 11A shows a block diagram of a signal analyzer according to an embodiment of the invention.

FIG. 11A shows a block diagram of a spectrum analyzer according to an embodiment of the invention. Receiver A12 includes an implementation of signal generator 10 as disclosed herein (e.g. implementation 10, 20a, 20b, 200, 700, 720, etc.), possibly configured as a local oscillator. For example, receiver A12 may have a superheterodyne configuration in which a local oscillator signal generated by an implementation of signal generator 10 is mixed or otherwise combined with the RF signal under test. By sweeping the local oscillator signal across a frequency range, receiver A12 may be configured to detect different frequency components of the signal under test.

Figure 11B:
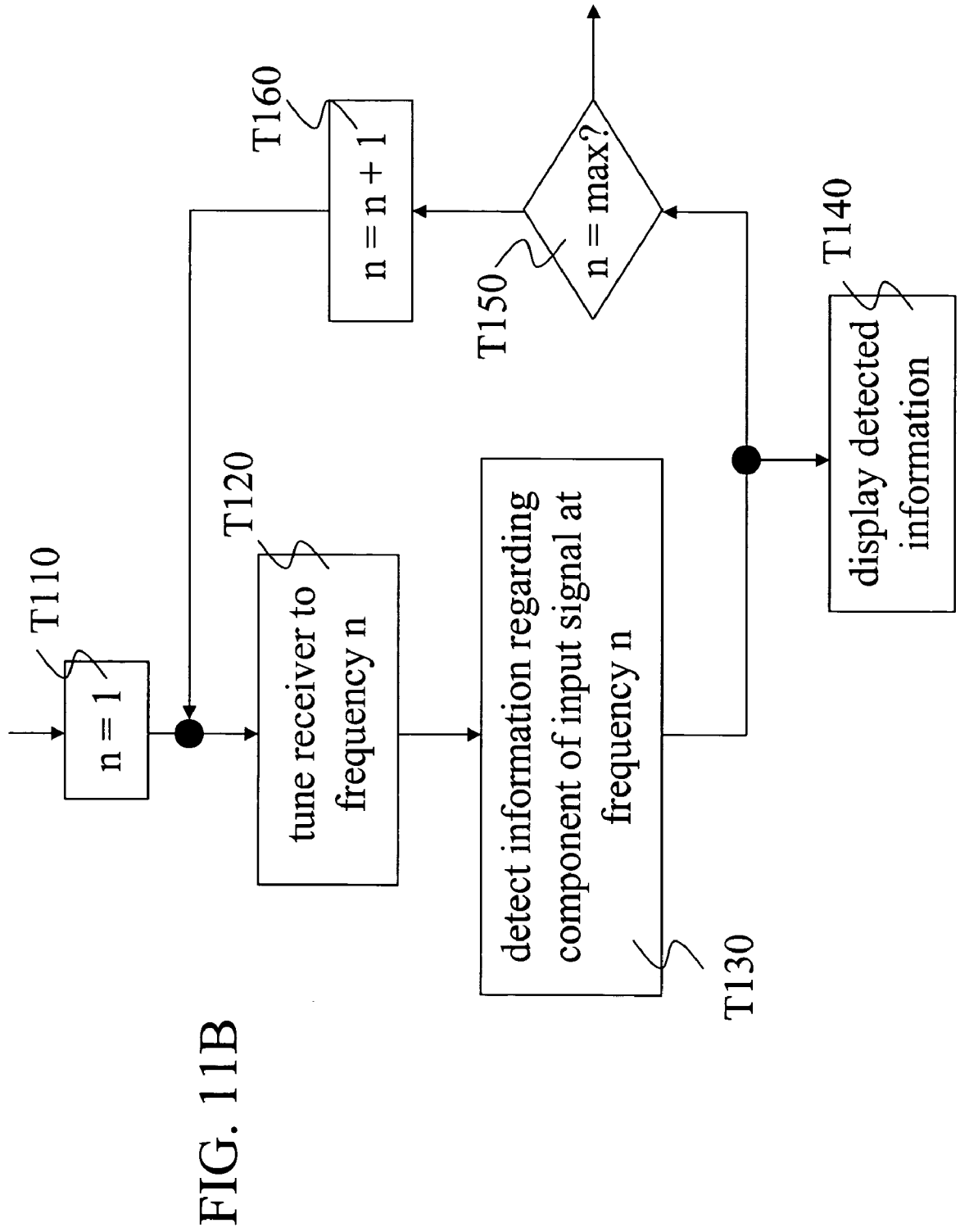
FIG. 11B shows a flowchart of a method of signal analysis according to an embodiment of the invention.

FIG. 11B shows a flowchart of a method of signal analysis according to an embodiment of the invention. Task T120 tunes a receiver to a predetermined frequency n. Task T130 detects information regarding a component of an input RF signal at the frequency n (e.g. within a bandwidth centered at or near frequency n). Task T140 presents a display based on the detected information. Tasks T110, T150, and T160 cause the receiver to repeat receiving and detecting tasks T120, T130 at a number of frequencies.

Figure 11C:
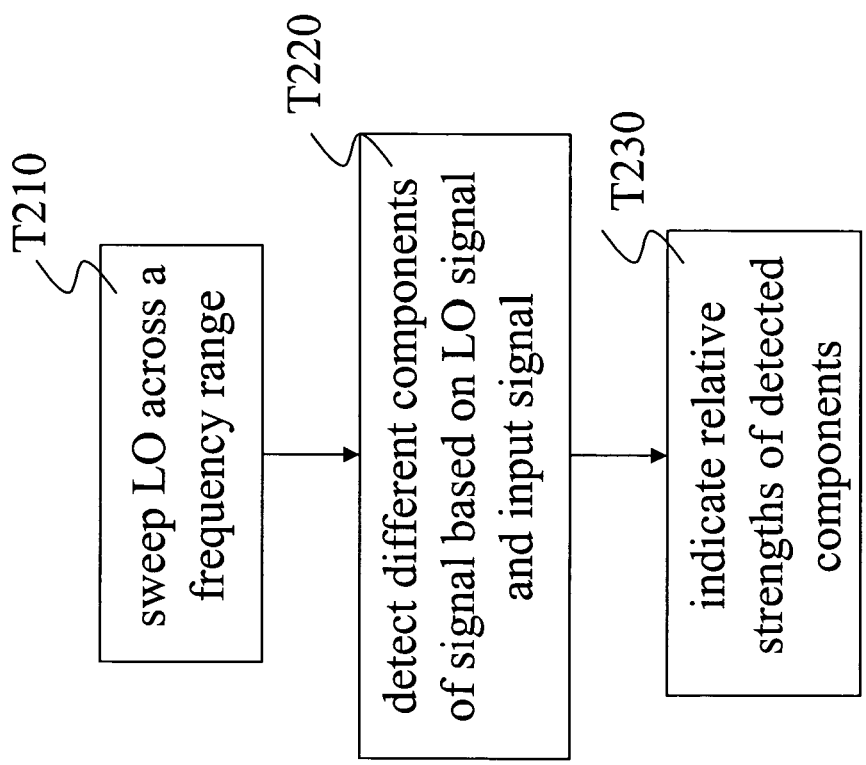
FIG. 11C shows a flowchart of a method of signal analysis according to another embodiment of the invention.

FIG. 11C shows a flowchart of a method of signal analysis according to another embodiment of the invention. Task T210 sweeps a local oscillator (LO) across a frequency range. Such a sweep may be repeated if desired. For example, the sweep may be repeated according to a time interval suitable for the particular application, either with or without intervals between sweeps. Sweeps may be performed always in one direction (e.g. sweeping from low to high frequency) or may be bidirectional (e.g. sweeping from low to high frequency followed by sweeping from high to low frequency). Task T220 detects different components of a signal based on the LO signal and an input signal. Task T230 indicates relative strengths of the detected components.

Other components of receiver A12 may include a resolution bandwidth filter; an envelope detector; a logarithmic amplifier; a video bandwidth filter; and other filters, detectors, and/or control circuitry. At least a portion of receiver A12 may be implemented using digital rather than analog signal processing techniques. Display A14 may include a video display (e.g. a cathode-ray tube or a flat-panel device such as a liquid-crystal or organic LED panel).

Figure 11D:
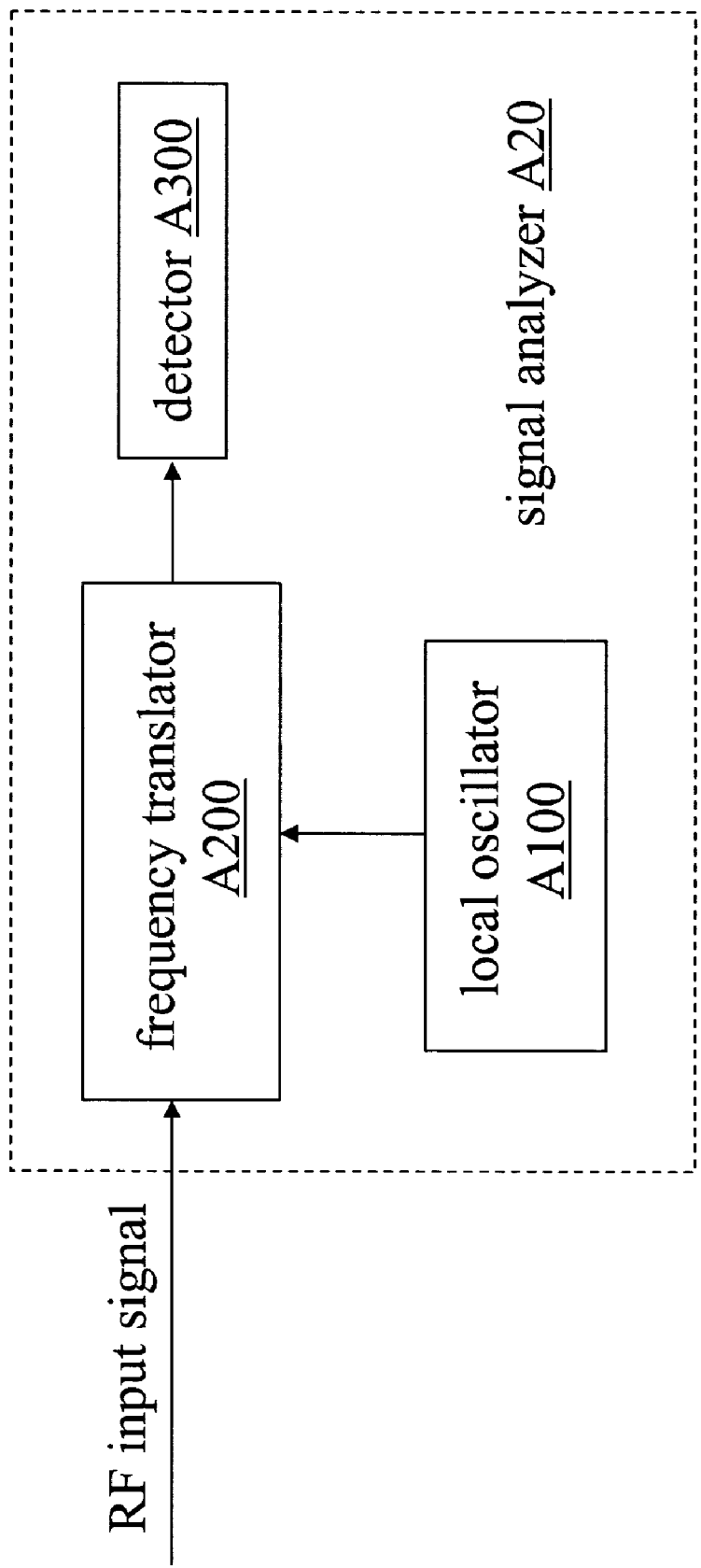
FIG. 11D shows a block diagram of a signal analyzer according to another embodiment of the invention.

FIG. 11D shows a block diagram of a signal analyzer A20 according to an embodiment of the invention that is configured to receive a RF input signal for analysis. Local oscillator A100, which includes an implementation of signal generator 10 as disclosed herein (e.g. implementation 10, 20a, 20b, 200, 700, 720, etc.), generates a local oscillator signal.

Frequency translator A200 receives the local oscillator signal and the RF input signal and outputs an intermediate frequency (IF) signal. The term "frequency translator" is used herein to indicate one or more devices such as, for example, a mixer (e.g. a Schottky diode mixer; a diode ring mixer; an unbalanced, single-balanced, double-balanced, or triply-balanced mixer; etc.), a multiplier (e.g. an analog multiplier), or possibly another type of upconverter or downconverter as may be suitable for the particular frequencies and/or design criteria involved.

Selection and construction of frequency translator A200 may be accomplished according to principles known in the art. For example, a mixer may include components such as diodes (e.g. Schottky diodes and/or diode quads) and/or coils (e.g. transformers and/or baluns, LTCC- or ferrite-based). A particular mixer configuration may be selected based on criteria such as linearity, conversion loss, conversion compression, isolation (e.g. RF-IF, LO-IF, and/or LO-RF), dynamic range, frequency range, DC polarity, DC offset, two-tone third-order intermodulation distortion, intercept point (e.g. third-order intercept or "IP3"), maximum voltage-standing-wave-ratio (VSWR), and/or LO drive level. Signal analyzer A10 may also include an attenuator in the input signal line upstream of frequency translator A200, which attenuator may be adjustable and may serve to limit the input signal power.

Detector A300 receives the IF signal and outputs an indication of a signal strength (e.g. an envelope) of the IF signal. For example, detector A300 may convert an AC voltage of the IF signal to a DC voltage. Detector A300 may include a circuit such as an envelope detector or a root-mean-square-to-direct-current converter. An envelope detector may include a rectifier such as a diode or other nonlinear device (possibly configured to convert energy of the input signal to a current proportional to the power of the input signal), an output of which may be coupled to a peak detector or low-pass filter (such as a parallel combination of a resistance and a capacitance). Alternatively, detector A300 may be implemented digitally.

Further implementations of signal analyzer A10 may include such elements as a logarithmic amplifier (which may be upstream or downstream of detector A300) and one or more filters. For example, an implementation of analyzer A10 may include a filter A400 upstream of detector A300 that has an adjustable bandwidth. By adjusting the bandwidth of the passband of filter A400, for example, an output of detector A300 may be related to a wider or more narrow portion of the input RF signal (e.g. to establish a measurement resolution). Such further elements may be implemented as analog circuit elements and/or digitally.

In further implementations of signal analyzer A20, local oscillator A100 may be controlled to sweep across a frequency range, such that detector A300 may output indications of signal strength that correspond to different frequency components of the RF input signal. Implementations of signal analyzer A20 may also include a storage element (such as a semiconductor memory) and/or a display (e.g. a video display) respectively to store and display information relating to the indications outputted by detector A300.

Figure 11E:
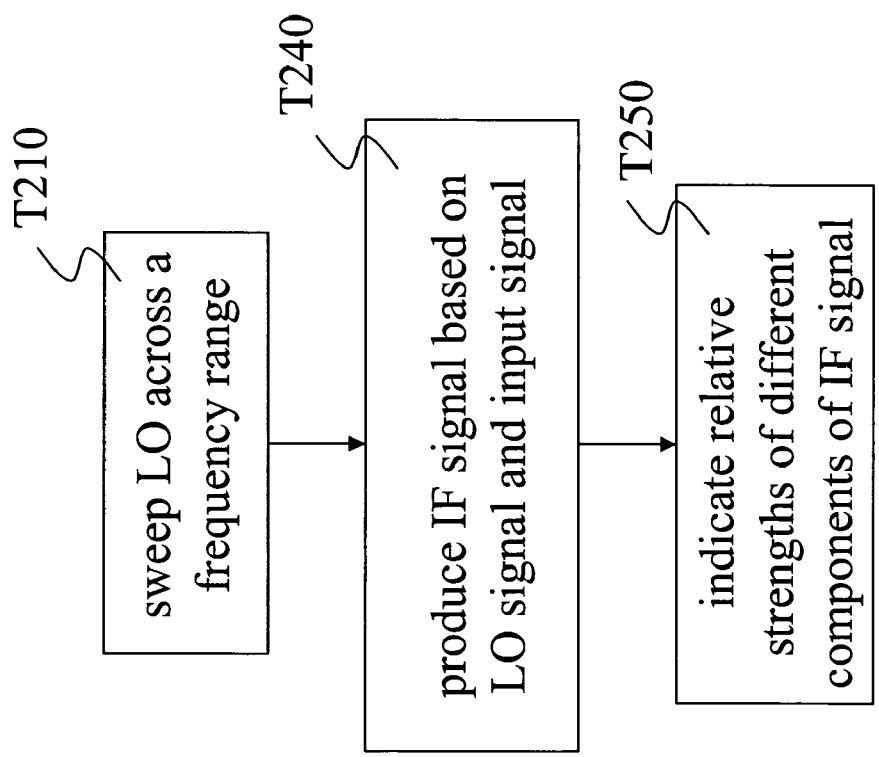
FIG. 11E shows a flowchart of a method of signal analysis according to another embodiment of the invention.

FIG. 11E shows a flowchart of a method of signal analysis according to another embodiment of the invention. Task T240 produces an intermediate frequency (IF) signal based on the LO signal and an input signal. Task T240 indicates relative strengths of different components of the IF signal.

Figure 11F:
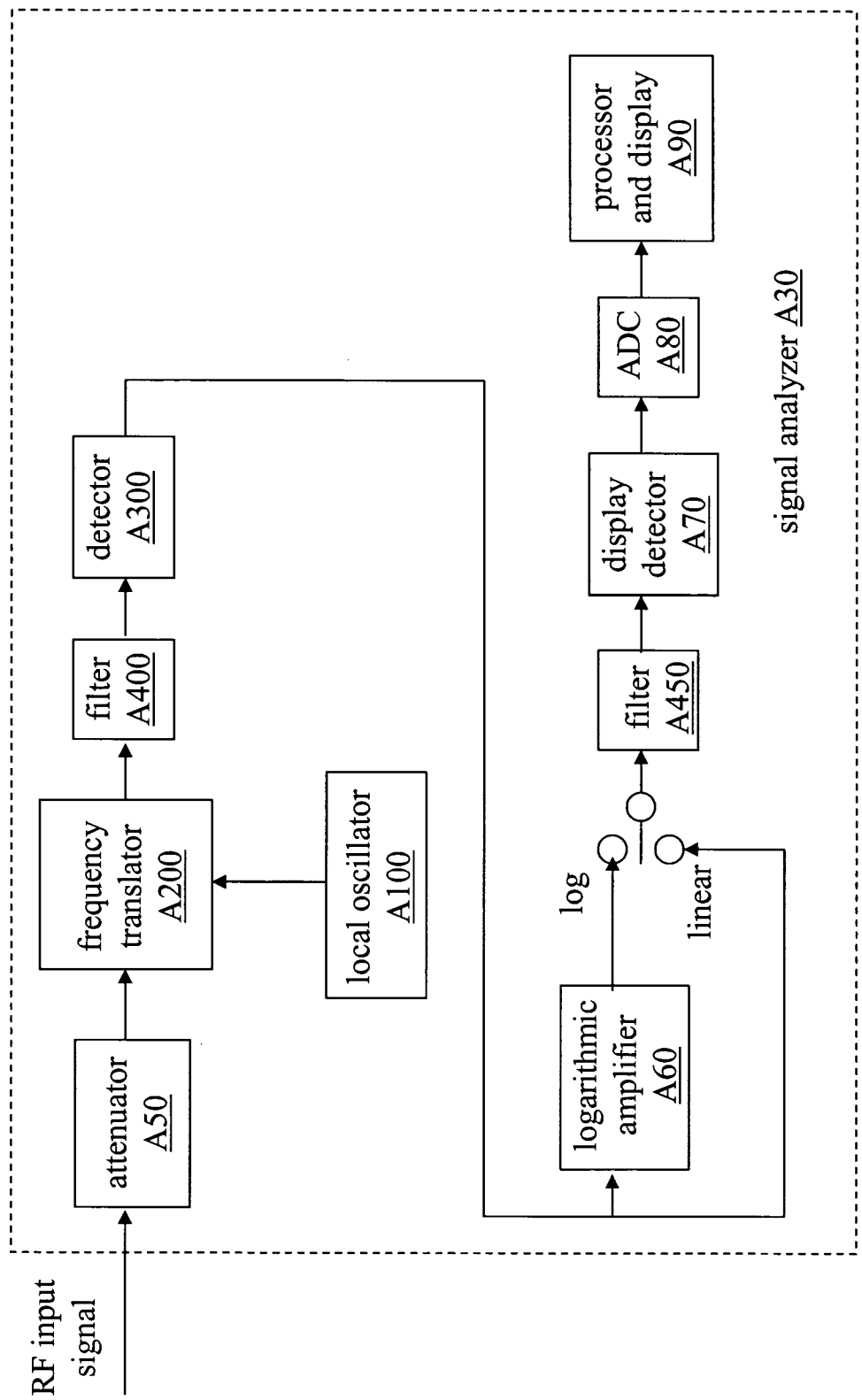
FIG. 11F shows a block diagram of an implementation of a signal analyzer as shown in FIG. 11D.

FIG. 11F shows an implementation A30 of signal analyzer A20 that includes an attenuator A50 and a logarithmic amplifier A60 as discussed above. In an alternative implementation, amplifier A60 may be upstream of detector A300. Analyzer A30 also includes a post-detection filter A450 that is configured, for example, to filter a signal based on the detected envelope of the signal under test. Filter A450 may have a variable bandwidth, e.g. to perform an averaging function upon a wider or more narrow portion of the detected signal. Display detector A70 may provide several selectable operations such as a peak detector (positive and/or negative), a quasi-peak detector, a sample detector, and/or an averaging detector, and may detect, store, and/or output corresponding values of the detected signal.

Analog-to-digital converter A80 converts the signal detected by (and/or bypassing) display detector A70 to a series of digital samples. In an alternative implementation, ADC A80 may be moved to an upstream location such that digital implementations of one or more of display detector A70, filter A450, log amplifier A60, detector A300, and filter A400 may operate on a signal based on an output of ADC A80. Processor and display A90, which includes a display A14 as disclosed above, may perform functions relating to user interaction with analyzer A30 (e.g. storage of all or part of a display screen, marker selection, display adjustment).

As noted above, one potential advantage of at least some implementations of signal generator 10 as described herein is an ability to switch from one output frequency to another very rapidly. Such an ability may be applied to advantage in a swept-receiver operation, for example, to allow an increased number of sweeps across a given span in a given time period. Potential applications of a faster sweeping capability include detection and/or tracking of short-lived events. Such capability may also be applied to provide a faster refresh rate (e.g. to a display or to further processing equipment). If desired, such an increase in sweep rate may be achieved without sacrificing frequency resolution (e.g. as indicated by the number of discrete frequency points tuned during a sweep and/or the bandwidth of a pre-detection filter such as filter A400).

Alternatively, a fast frequency-switching ability may be applied to provide more points in a sweep across a given span over a given time period. Such an increase in tuning density may allow measurements of higher resolution to be achieved: with more frequency points being visited in the sweep, for example, a narrower resolution bandwidth may be used without leaving any portion of the span undetected. Such higher resolution may in turn lead to advantages of better discrimination (e.g. between nearby signals). Increased discrimination ability may be useful in applications such as TSCM (technical surveillance counter-measures), where it may be desired, for example, to distinguish a hostile signal that may be positioned very close to a legitimate signal. Higher tuning resolution may also lead to advantages of a lower noise floor (e.g. as a result of a narrower pre-detection bandwidth). Of course, operations combining advantages of increased sweep rate and increased tuning density, to varying respective degrees as may be desired, may also be performed.

As noted above, signal generators including switched multi-DDS configurations as described herein (e.g. an implementation of synthesizer 200 or 720) may be used to achieve an even higher frequency-switching speed. In an exemplary application of one such configuration to a swept-receiver application, a first divider DDS outputs a signal to the mixer while a second divider DDS is configured to output a future signal to the mixer. Such configuration may include, for example, entering a ratio corresponding to the next receive frequency into the second divider DDS. At an appropriate moment (e.g. after setup of the second divider DDS is complete), the output of the second divider DDS is switched onto the signal generator output, while the first divider DDS is reconfigured in like fashion for another future signal.

One potential advantage of at least some implementations of signal generator 10 as disclosed herein is a high signal-to-noise ratio (SNR). Accordingly, signal analyzers and methods of signal analysis employing such implementations may have a reduced noise floor as compared to existing analyzers and methods and/or may offer a comparable performance at a reduced cost, weight, size, and/or power consumption.

One characteristic of at least some existing PLL tuners that may limit an achievable SNR is phase noise. For example, phase noise may result from phase modulation effects of the loop, which may lead to an elevated noise floor around the carrier. In a swept-receiver application, phase noise in the local oscillator may add to the mixer output, thereby contributing to the noise floor. As discussed herein, one potential advantage of at least some implementations of signal generator 10 as disclosed herein is low phase noise.

Currently, the noise floor characteristic of available spectrum analyzers is too high to permit measurement of integrated phase noise, at least without the use of additional and expensive low-phase-noise signal generators. At least some signal analyzers and methods of signal generation according to embodiments of the invention as disclosed herein may be used to perform phase noise measurement without a need for an additional low-phase-noise signal generator.

Further embodiments of the invention include other test and measurement devices having signal generators as described herein, such as FFT analyzers, network analyzers, and test signal generators. One or more such devices may be used, for example, for receiver testing in telecommunications applications. Potential advantages of such devices may include increased performance (e.g. with respect to one or more application-dependent criteria) and/or reduced size, cost, power consumption, and/or weight as compared to existing solutions. One or more such advantages may be leveraged to support use of such devices in applications where existing solutions may be impractical for one or more reasons, such as mobile or airborne platforms.

Figure 12:
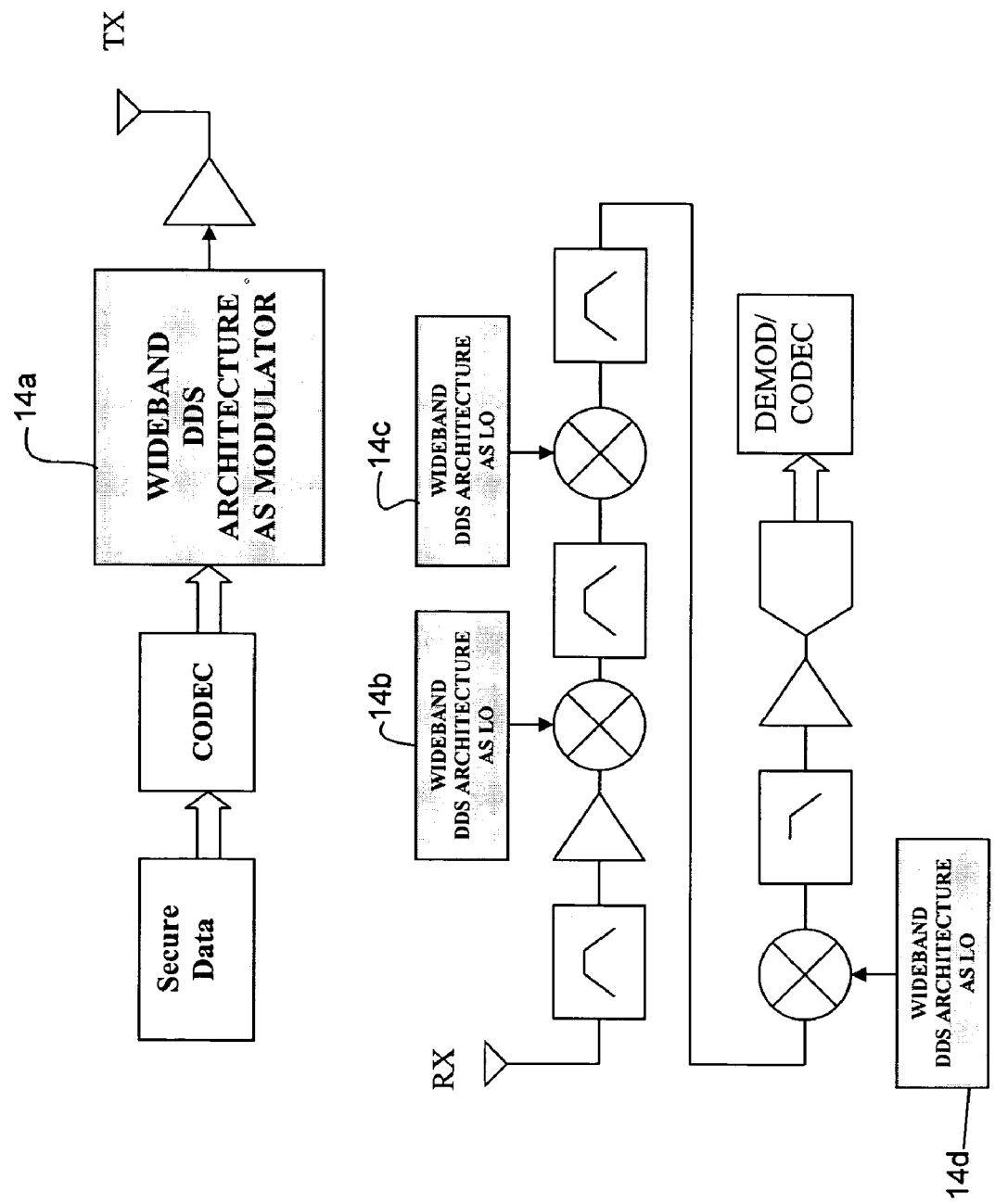
FIG. 12 is a block diagram of a secure transceiver having a modulation scheme provided in accordance with an embodiment.

FIG. 12 is a block diagram of a secure transceiver 1200 having a modulation scheme provided in accordance with an embodiment. The modulation capabilities of embodiments of the present invention may be useful in such a transmitter/receiver (transceiver). For example, the low phase noise and spectral purity provided by embodiments of the invention may enable implementation of high order complex modulation types and frequency hopping, which are prerequisites for some forms of secure transmission. The transmitter may be used for standard communication or for specific applications such as radar.

In at least one embodiment, the transmitter portion of the transceiver 1200 includes a coder/decoder (CODEC) for encoding secure data and a signal generator 14a, including one or more implementations of signal generator 10 as described herein, for modulating the encoded data for RF transmission. Such embodiments may require filter modifications to accommodate the wideband modulated signal. Furthermore, in such embodiments the receiver portion of the transceiver 1200 may include substantially the components described herein with respect to FIG. 9, including use of signal generators 14b-d (each including one or more implementations of signal generator 10 as described herein) for local oscillator sources. However, in these embodiments the bandpass filter 913 (reference FIG. 9) may be implemented using a surface acoustic wave (SAW) device. Other filters (e.g., filters 903, 909, 919 and 923) may be implemented using dielectric or ceramic devices, or a hybrid thereof. Furthermore, oscillators 14c and/or 14d may be, in some embodiments, implemented using other solutions such as PLL-based or SRD-based signal generators.

Figure 13:
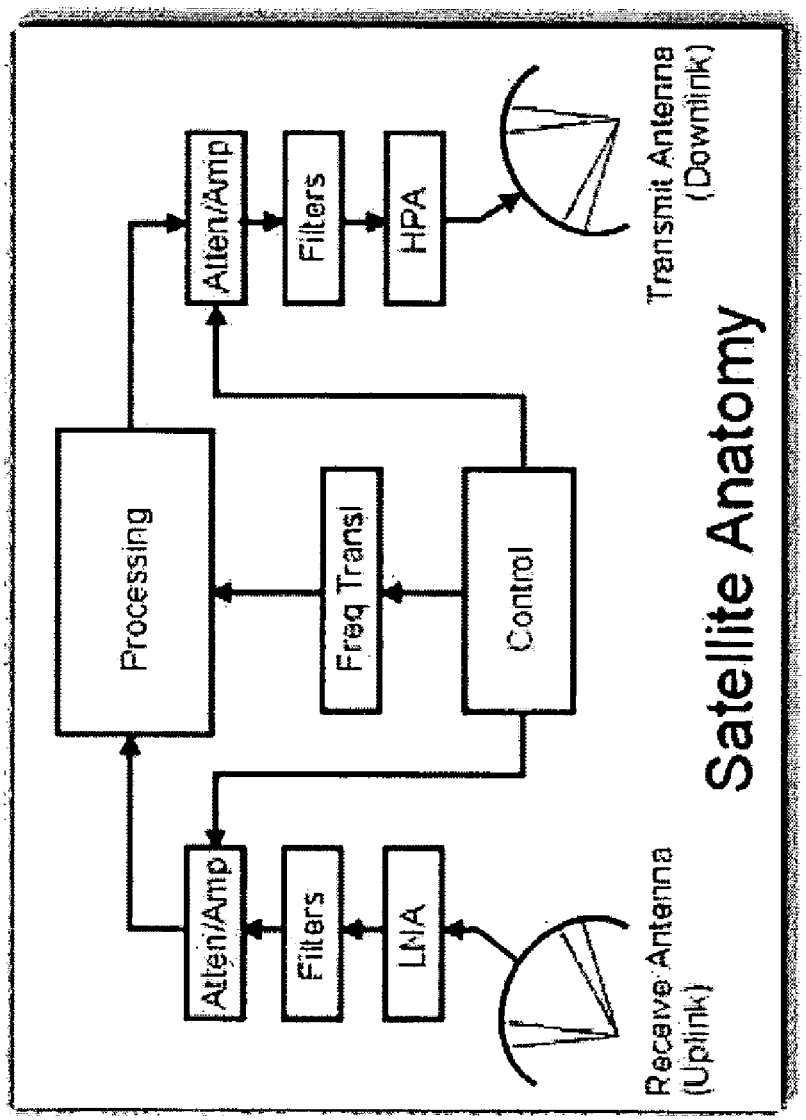
FIG. 13 is a block diagram of a satellite communication system in accordance with an embodiment.

FIG. 13 is a block diagram of a satellite communication system in accordance with an embodiment. Satellite communication typically requires at least three basic components: two earth links and a satellite link used as a transponder. Each of these components may include transmitters/receivers or frequency translators (e.g. mixers) in conjunction with which embodiments of the present invention may be utilized (e.g. as local oscillator signal generators).

Further embodiments of the invention include methods of signal modulation (and of demodulation) using an implementation of signal generator 10 as disclosed herein. One such method includes frequency hopping, in which the output frequency of the signal generator is varied (e.g. rapidly) to cause the carrier frequency of the modulated signal to hop from one frequency to another (e.g. according to a predetermined, possibly pseudorandom pattern). In one example, an implementation of signal generator 10 as disclosed herein (possibly an implementation of synthesizer 200 or 720) is used to achieve a hopping speed that renders the signal unreceivable by an existing PLL receiver.

Another method of signal modulation (correspondingly, demodulation) according to an embodiment of the invention includes using an implementation of signal generator 10 as described herein to generate a radio-frequency signal to perform phase-shift-keying (PSK) modulation. One such example includes performing quadrature-amplitude modulation (QAM). As shown in FIG. 14, QAM includes modulating a carrier in phase and amplitude.

FIG. 14 is a series of scatter plot diagrams showing examples of the effects of improved phase noise (e.g. as may be achieved in an application of at least some embodiments of the invention). Poor phase noise may result in the loss of data, increased BER (bit error rate) which results in distorted demodulation of data, or inability to demodulate in receivers. Note in this example that for 16-QAM the constellation points are well within the decision regions, whereas the 64-QAM example shows that decision errors (area within each grid) could be caused by only small noise excursions causing errors in data. The exceptional phase noise characteristics of at least some embodiments of the present invention would allow for much higher order signals to be demodulated with a huge reduction in bit-errors.

FIG. 14 shows that as a higher-level QAM scheme is applied, the QAM constellation becomes more compact, such that phase jitter (e.g. a time-domain manifestation of phase noise) may lead to an unacceptable bit-error rate or other measure of ambiguity. At least some implementations of signal generator 10 as disclosed herein may be applied to support high-level QAM applications: for example, 16-QAM, 64-QAM, or higher.

Another aspect of QAM that may cause ambiguity is rotation of the phase vector, e.g. by random processes in the transmission channel. One potential cause of such rotation is Doppler shift, which may arise e.g. due to relative movement between a receiver and transmitter. Methods according to further embodiments of the invention include using known methods to characterize and/or compensate for phase rotation. Embodiments of the invention also include methods of calibrating a receiver to remove a phase offset that may cause a rotation of the constellation. For example, such methods include transmitting a calibration signal having a predetermined phase (possibly periodically and/or as a channel training signal) and/or applying information based on the received calibration signal to correct a phase value of another portion of the received signal.

Commercially, embodiments of the present invention may be applied, for example, to increase the data transmitted in a given bandwidth, thus allowing for expansion of the capabilities of cellular telephony/data base stations rather than adding new cell-sites. In a transceiver, embodiments may be applied to implement complex, high-order modulation/demodulation at levels unachievable by current PLL systems. In addition, increased tuning speed would also allow hopping frequencies to be intercepted and traced when used in a receiver. On the transmit side, transceivers including embodiments of the invention could be implemented to tune faster than any present-day receiver (PLL) could detect. For defense-related applications, embodiments may be used in transmit/receive (transceiver) systems that would enable secure transmission.

Figure 15:
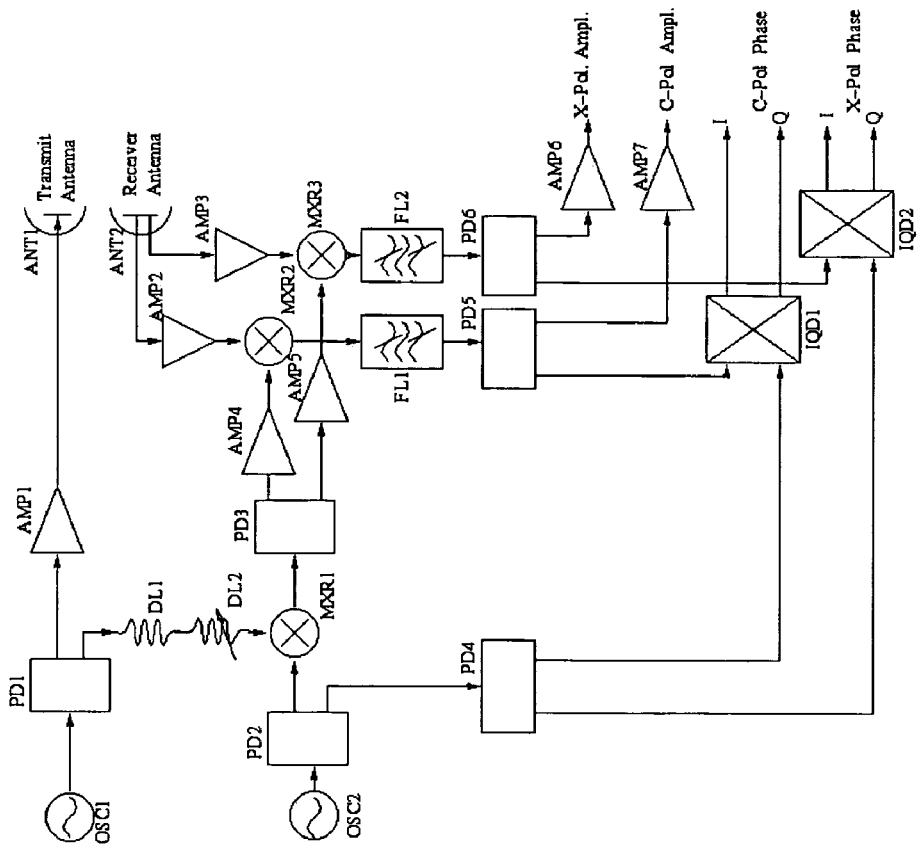
FIG. 15 is an overall block diagram of a radar system according to an embodiment.

FIG. 15 is an overall functional block diagram of a single-frequency radar system according to an embodiment. Such a radar system may include power dividers (e.g., PD1-PD6), amplifiers, delay lines (e.g., DL1 and DL2), and I/Q demodulators (IQD1-2) to produce cross-polarization and circular-polarization components as indicated in FIG. 15. For such radar applications, the spectral purity and repeatable behavior of signal generators as described herein may allow the radar signatures to be defined with greater resolution and accuracy. In particular, embodiments including implementations of signal generator 10 as described herein may be used to provide the OSC1 and/or OSC2 elements shown in FIG. 15 in order to implement a single-frequency or multiple-frequency radar system. In multiple-frequency applications, the delay line elements DL1 and DL2 may be implemented as variable and selectable based on the current frequency. Embodiments of the invention may also allow for a smaller, lighter packaged product in most applications and/or may exhibit repeatable behavior not available from PLL circuits. Embodiments may become even smaller as the speed of digital technology and DACs increases, reducing the need for peripheral hardware.

Figure 16:
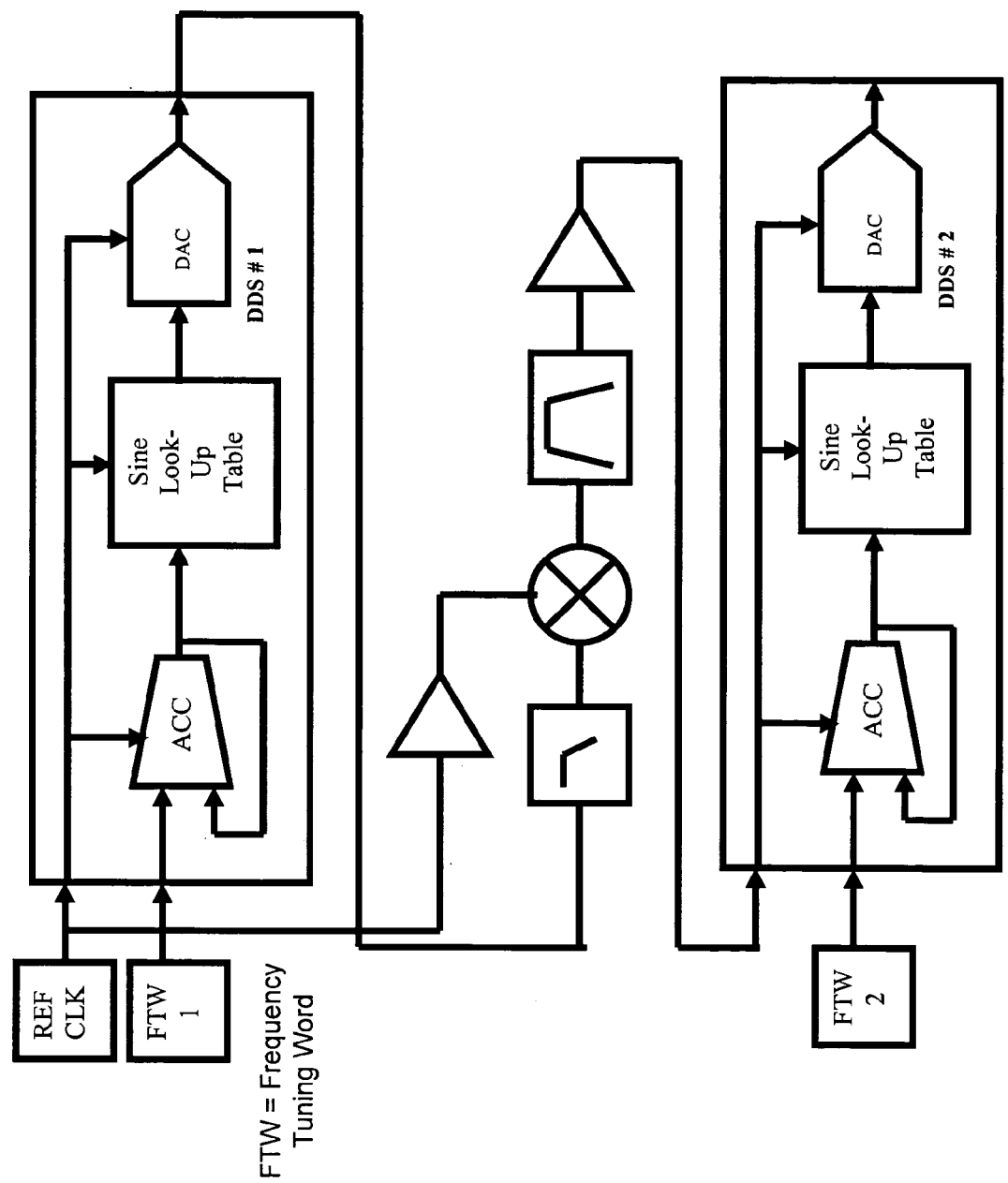
FIG. 16 is a block diagram of at least one embodiment of divider having a variable frequency input source.

In FIG. 16, embodiments of the present invention may be implemented any number of ways, including any variable frequency source in place of DDS #1 or by implementing the modified architecture as described with respect to the DDS Chip/Chip Sets embodiments. Characteristics of the embodiment shown in FIG. 16 will now be described.

In FIG. 16, DDS#1 may serve as a variable clock source for DDS#2. This clock source, in this example, may be created by mixing DDS#1 with 300 MHz and filtering to achieve 300 MHz+/−DDS#1, depending on the frequency requirements. It should be noted that the frequencies and components are used only for reference examples and clarity in this document; other variations are possible. The narrow-band spurious (i.e., unfilterable) performance is established by the spurious performance of DDS#1 and the divide ratio (tuning word) of DDS#2. The reduction of spurs on the output created by DDS#1 can be formulated as follows:

$$\text{Output spurious} = DDS\#1 \text{ spurious} - 20 \log N \quad \text{(Eq. 1)}$$

where N=divide ratio of DDS#2 or $2^X$/FTW where X is number of phase accumulator bits.

For example, DDS#1 may have a worst case spurious of −75 dBc; the frequency tuning word (FTW) of DDS#2 may be ¼ total resolution or the divide ratio is 4.

$$\text{Output spurious} = -75 - 20 \log 4$$
$$= -75 - 12$$
$$= -87 \text{ dB}c$$

Determining the spurious performance needed for a given application will determine the SFDR for DDS#1. In general, the DAC is the largest contributor to spurious performance, and can be characterized as follows:

$$dBc = 20 \log \tfrac{1}{2}^N \quad \text{(Eq. 2)}$$

where N=number of DAC bits or dBc≈−6*N

Therefore, for a 12-bit DAC, ≈−6*12=72 dBc and for a 14-bit DAC, ≈−6*14=84 dBc.

Increasing the DAC resolution (bits) and/or using spurious reduction techniques, such as dithering, may improve DAC spurious performance. Dithering can be used to reduce the amplitudes of individual spurious responses, although dithering may also degrade the overall SFDR (noise floor), since dithering spreads the noise/spur in the frequency domain.

The output of the translated (mixed) DDS#1 frequency may then be supplied as the system clock for DDS#2. DDS#2 may be tuned to an optimum (spurious free) spot. The output is changed by then varying DDS#1 (SYSCLK for DDS#2).

In order to determine the optimum spot for DDS#2, it should be noted that there are two main types of spurious responses in a DDS output: DAC errors (e.g., non-linearities and quantization errors) and phase truncation spurs. The phase truncation spurs worst case are as follows. For example, if the number of phase bits (after truncation) is 19, then the phase truncation error may be approximated as 19 bits*6.02≈114 dBc. This worst-case condition (−114 dBc) only takes place in a single bit pattern for the truncated bits. The pattern is a 1 for the MSB and all zeroes in the remaining bits. As demonstrated by a worst case of −114 dBc, the phase truncation is not a major contribution to the spurious performance and is not considered.

A second source of spurious responses is DAC error, including quantization error and DAC non-linearity. These spurs, which are created at harmonics of the fundamental frequency, may be aliased into the signal bandwidth, and are predictable and reproducible.

Figure 17:
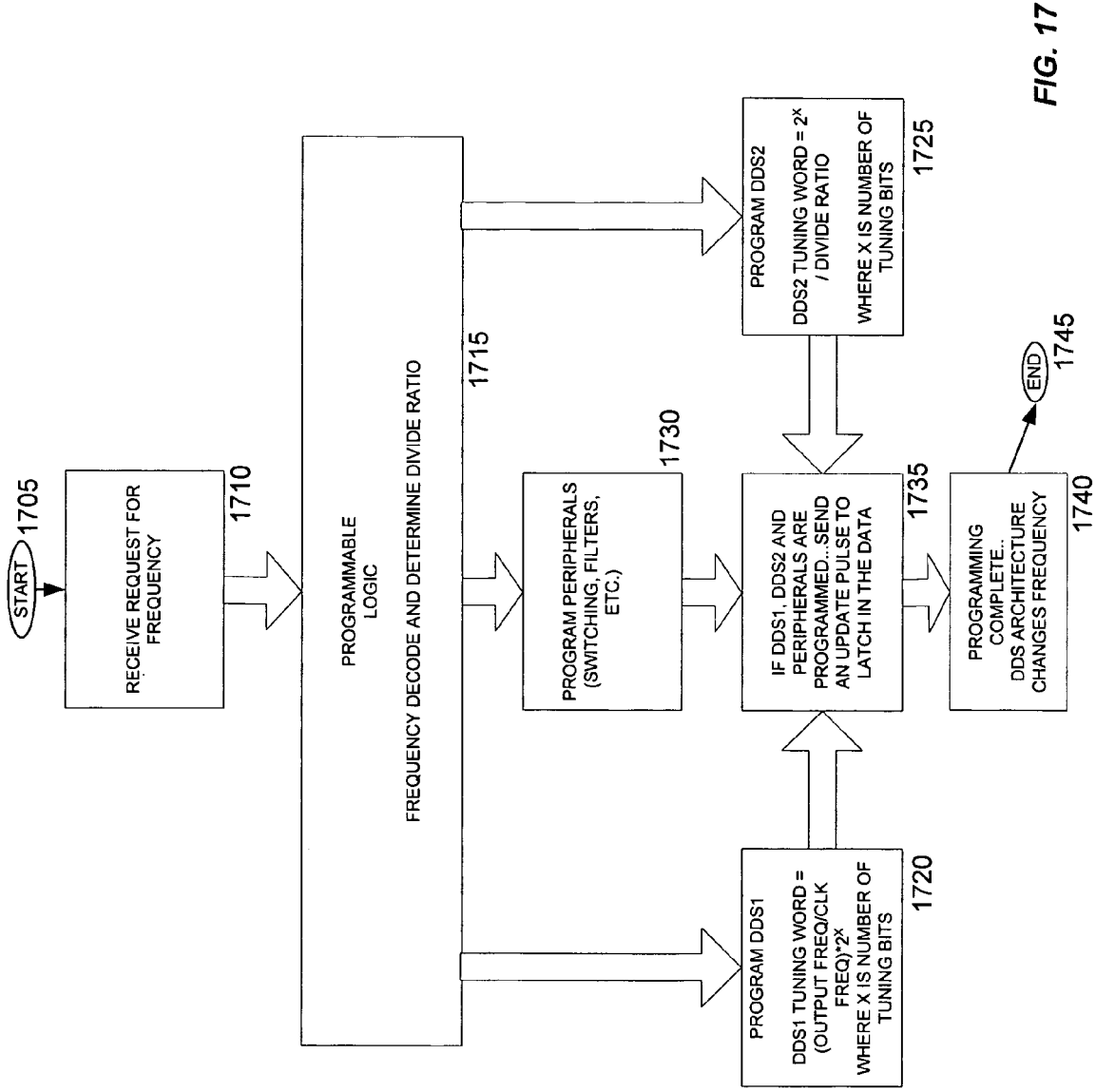
FIG. 17 is a flow diagram of a method according to at least one embodiment.

FIG. 17 illustrates a wideband signal generation method 1700 in accordance with at least one embodiment. The method 1700 may be implemented in an embodiment, for example, as logic in a Field Programmable Gate Array (FPGA). However, other variations are possible. For example, the method 1700 may alternatively be implemented using a sequence of programmed instructions or software executed by a processor, microprocessor, microcontroller, or personal computer, or using discrete logic components.

As shown in FIG. 17, a wideband signal generation method may commence at block 1705. Control may then proceed to task 1710, which receives a request for an output signal (e.g. from a user or from a hardware or software component of an application). The request may indicate at least a specified signal frequency. Control may then proceed to task 1715, which determines a divide ratio for a divider based on the requested output signal frequency and a clock source frequency. Control may then proceed to tasks 1720, 1725 and 1730, which generate at least one control signal (e.g. one or more control words) corresponding to the divide ratio determined at task 1715 and select a bandpass filter from a set of filters based on the divide ratio. In an embodiment, a control signal may include a specification of a frequency, phase offset, and/or amplitude scaling.

Control may then proceed to task 1725, which provides the control signal(s) to their corresponding dividers. In an embodiment, this task may be accomplished by loading (e.g., latching) control words into corresponding registers in the divider. In at least one embodiment, the divider is a DDS in accordance with the synthesizers and signal generators described herein. Task 1725 may also include selecting appropriate filters (e.g. among filters 167) and/or switch positions based on the requested frequency and/or a related value that may be selected in accordance with the requested frequency (e.g. the frequency ratio, the clock source frequency, a frequency of a signal to be filtered or passed).

Control may then proceed to task 1735, which commands the at least one divider to begin operating according to the control signal(s). Control may then proceed to task 1740, which changes the frequency of the synthesizer in accordance with the new control signal(s). Control may then proceed to block 1745, at which the method may end. The method 1700 may be repeated as necessary and as often as required to support the application for the wideband synthesizer.

The plots shown in FIGS. 18-23 illustrate principal frequencies of simulated outputs of embodiments of signal generator 20, including spurious components due mainly to DAC error (which may include quantization error and/or DAC non-linearities). The plots also illustrate aliasing and to show the optimum frequencies to tune the DDS. For example, the best tuning spot to nullify DAC spurious responses may correspond to DDS tuning words that create integer divide values.

Figure 18:
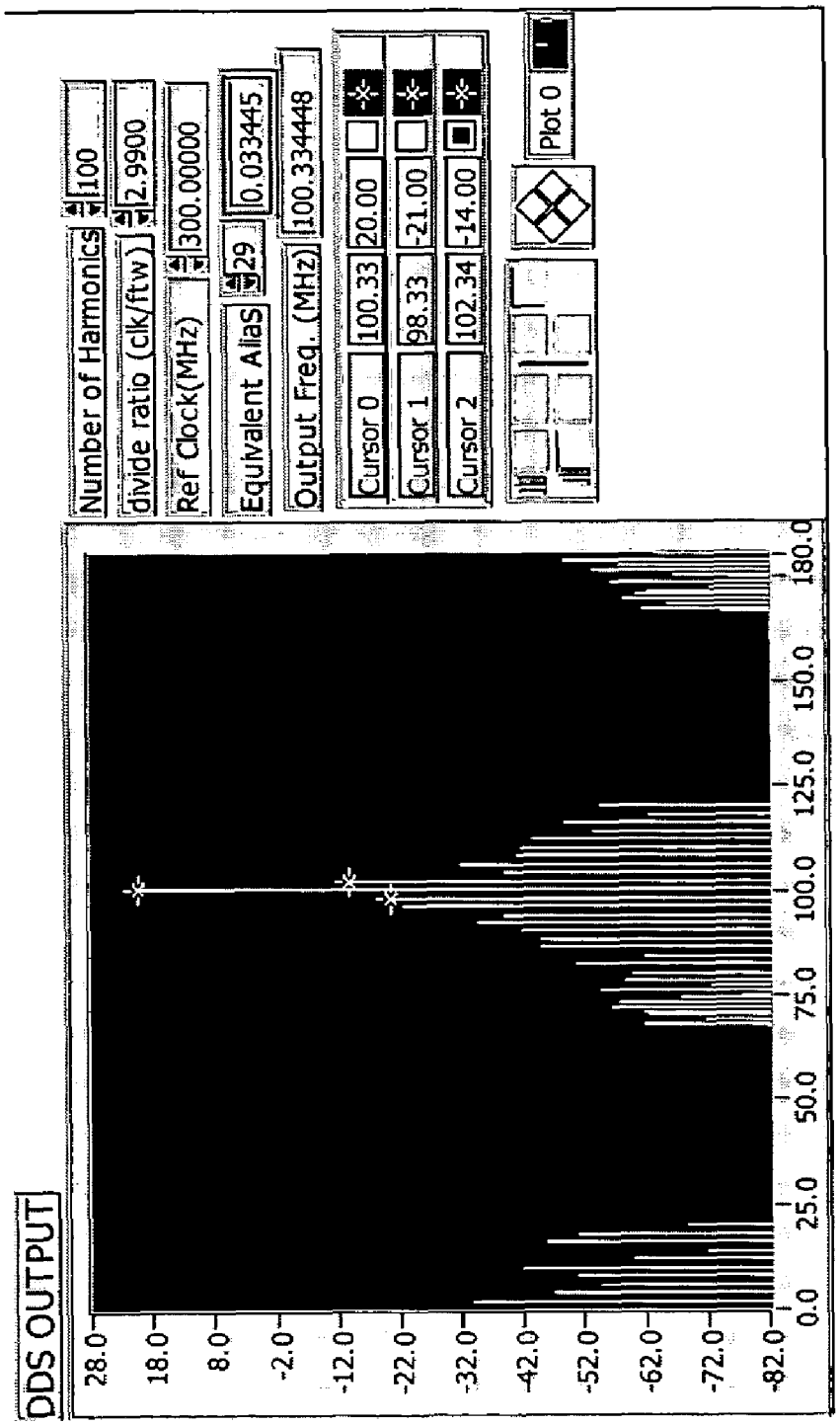
FIG. 18 shows a theoretical plot of the output signal produced by at least one embodiment having a divide ratio of 2.990.
Figure 19:
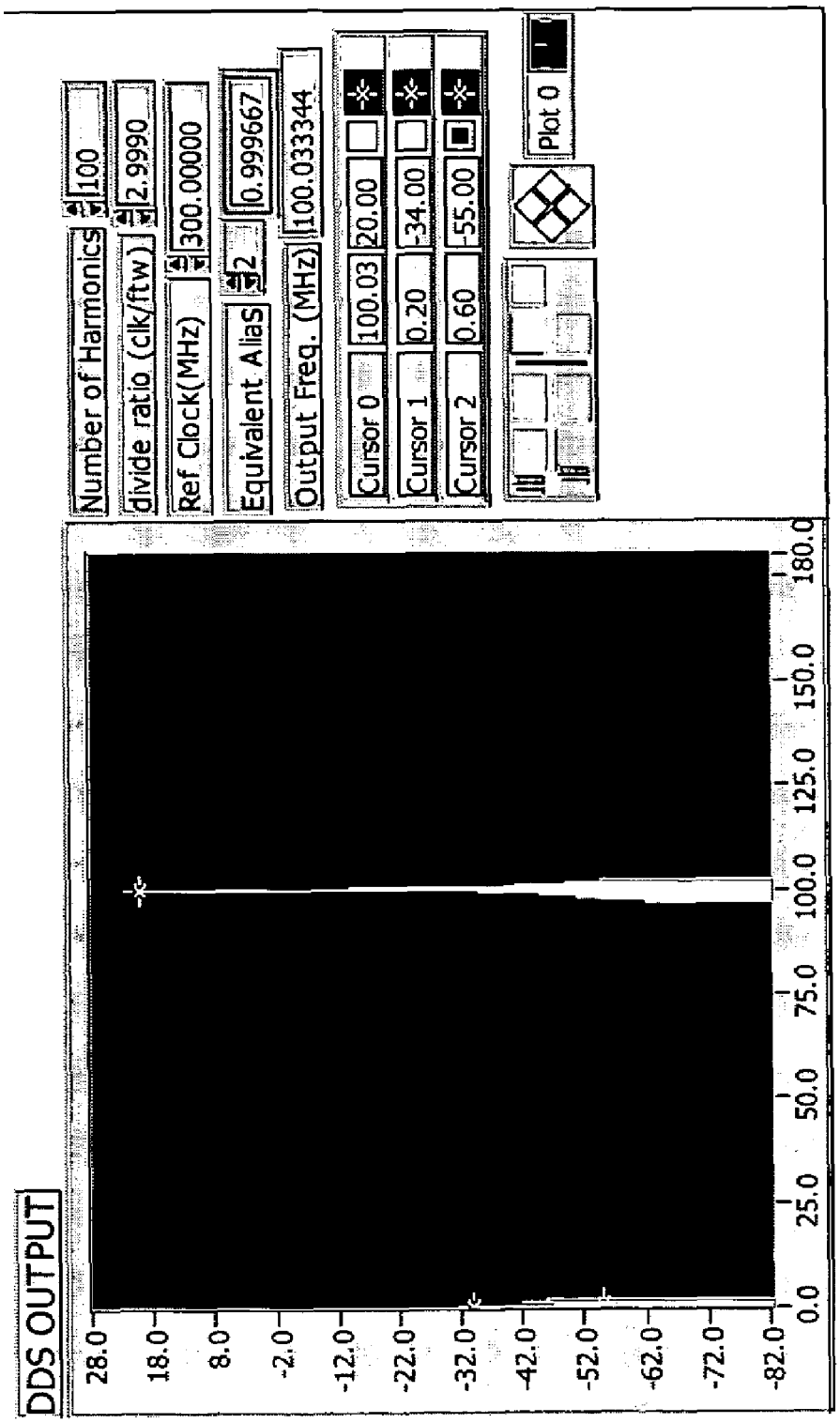
FIG. 19 shows a theoretical plot of the output signal produced by at least one embodiment having a divide ratio of 2.999.
Figure 20:
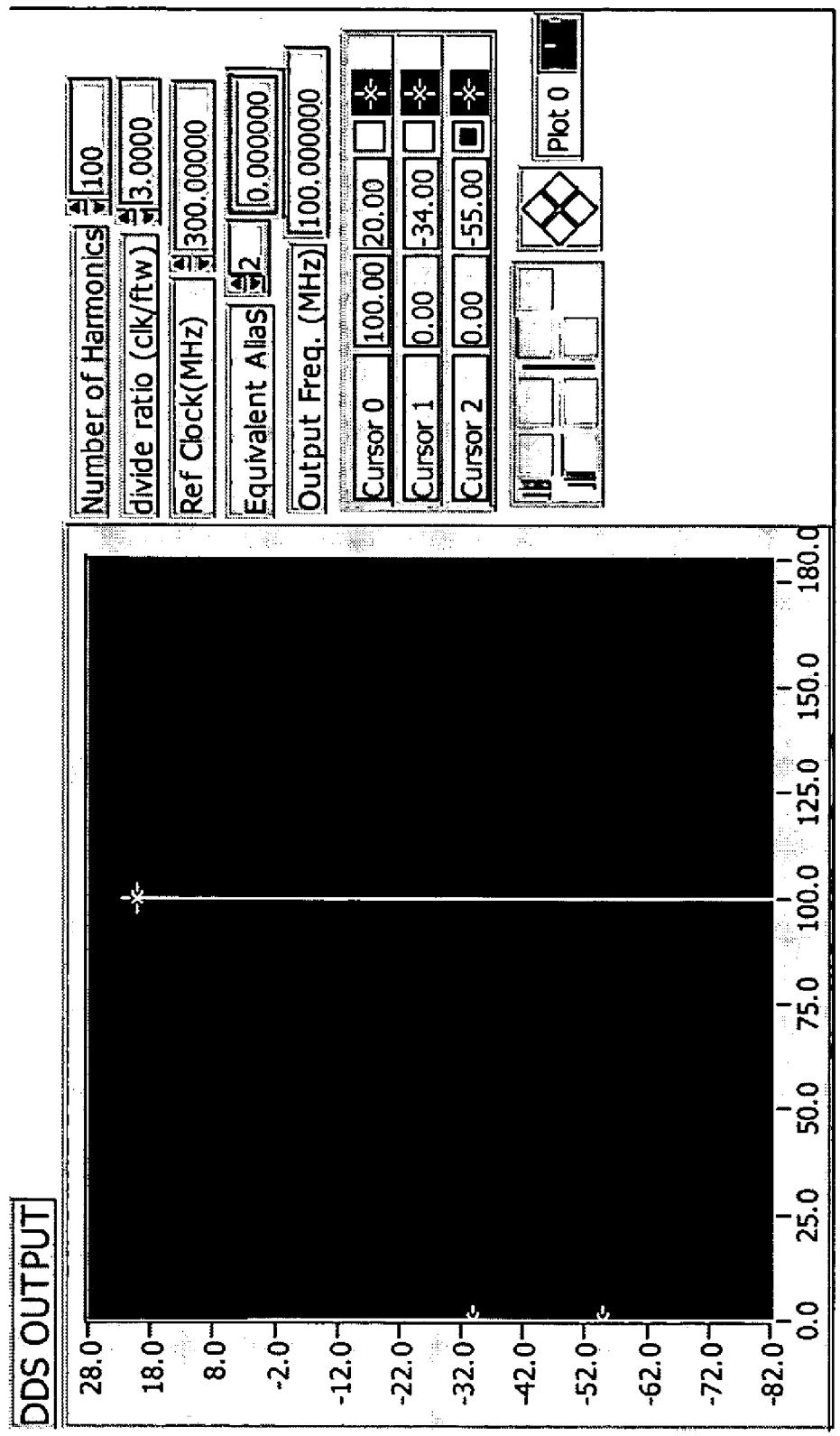
FIG. 20 shows a theoretical plot of the output signal produced by at least one embodiment having a divide ratio of 3.000.
Figure 22:
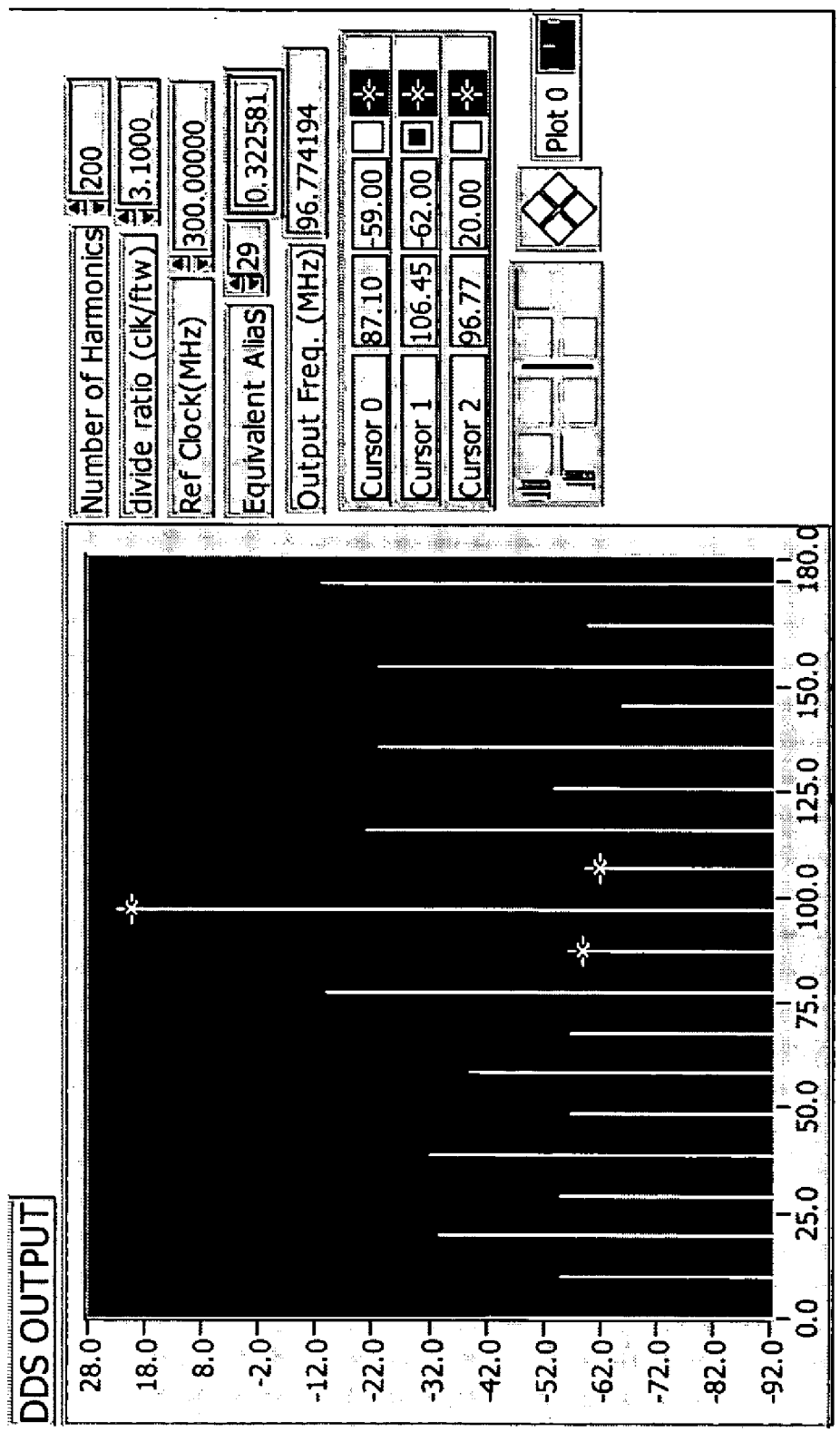
FIG. 22 shows a theoretical plot of the output signal produced by at least one embodiment having a divide ratio of 3.1000.

FIG. 18 shows a theoretical plot of the output signal produced by at least one embodiment having a divide ratio of 2.990, which generates spurious terms. FIG. 19 shows a theoretical plot of the output signal produced by at least one embodiment having a divide ratio of 2.999, which also generates spurious terms, but closer to the fundamental (i.e., the terms are converging on the fundamental). FIG. 20 shows a theoretical plot of the output signal produced by at least one embodiment having a divide ratio of 3.000. FIG. 21 shows a theoretical plot of the output signal produced by at least one embodiment having a divide ratio of 2.5000. FIG. 22 shows a theoretical plot of the output signal produced by at least one embodiment having a divide ratio of 3.1000. Finally, FIG. 23 shows a theoretical plot of the output signal produced by at least one embodiment having a divide ratio of 6.1991.

FIG. 20 shows an even integer divide value (e.g., divide ratio=3.000). Such a ratio may be the optimum spot for the second (i.e. final) DDS, as all image terms are hidden underneath the fundamental. This condition allows tuning and/or modulation of an upstream DDS (e.g. DDS#1 ) without affecting the SFDR of a later DDS (e.g. DDS#2 ) in its current state, which allows for a clean, spurious free output. The spurious components hidden by the fundamental may be of arbitrary but deterministic phase due to this synchronous, discrete system, and they do not result in noticeable amplitude variations within the Nyquist band.

Referring back to FIG. 18, it will be observed that the spurious components converge onto the fundamental frequency as the divide ratio nears an integer value. The plot of FIG. 20 shows the spurious free performance as the terms are located directly beneath the carrier. The second best case is when the tuning word creates an integer +/−0.5 as shown in FIG. 21. This case creates spurious terms at the 0.5 and 1.5 times the output frequency, significantly due to DAC error. For example, the third spurious term shown in the plot below is an image of the $2^{nd}$ harmonic of the fundamental. As spur location in this case is predictable, such a ratio may be used depending on the specifications, bandwidth and filtering implemented.

The third option is an extension of the second case. This could be accomplished by programming a tuning word that creates an integer +/−0.1, +/−0.2, +/−0.3, or +/−0.4. Table 3 below helps to predict the spurious locations of this case (as shown in the example of FIG. 22).

TABLE 3

| Integer Divide +/− 0.X | Calculation of closest spur to Fundamental |
| --- | --- |
| 0.1 | Output Freq +/− (0.1 * Output Freq) |
| 0.2 | Output Freq +/− (0.2 * Output Freq) |
| 0.3 | Output Freq +/− (0.1 * Output Freq) |
| 0.4 | Output Freq +/− (0.2 * Output Freq) |
| 0.5 | Output Freq +/− (0.5 * Output Freq) |
| 0.6 | Output Freq +/− (0.2 * Output Freq) |
| 0.7 | Output Freq +/− (0.1 * Output Freq) |
| 0.8 | Output Freq +/− (0.2 * Output Freq) |
| 0.9 | Output Freq +/− (0.1 * Output Freq) |

A further case that may be implemented using these embodiments, as shown in FIG. 23, requires additional filtering and frequency planning. This case may be achieved by characterizing the specific DDS and DAC used, and selecting bands that are observed to be spurious-free based upon the DAC characterization as shown in FIG. 23. This case depends heavily on performance criteria, the DAC characteristics, and filtering. While this case may produce a more narrow output band in comparison to the above architectures, it still offers an improvement over present single-DDS architectures.

By using the plots as shown in FIGS. 18-23 and Table 3 above, we can summarize the optimal spots (in order) for DDS#2 which are as follows:

DDS#2 set to Integer value (CLK/Freq. Tuning Word=Integer)

DDS#2 set to Integer value +/−0.5 (2.5, 3.5, 4.5, . . . N.5)

DDS#2 set to Integer value +/−0.1, +/−0.2, +/−0.3 or +/−0.4

Random (observed) optimal tuned spot based upon DDS and DAC characterization.

While the invention has been described with reference to the certain illustrated embodiments, the words that have been used herein are words of description, rather than words of limitation. Changes may be made, within the purview of the appended claims, without departing from the scope and spirit of the invention as disclosed herein. Although embodiments of the invention have been described herein with reference to particular structures, acts, and materials, the invention is not to be limited to the particulars disclosed but rather can be embodied in a wide variety of forms, some of which may be quite different from those of the disclosed embodiments and/or may lack aspects or advantages found in other embodiments, as may be encompassed by the scope of the appended claims.

We claim:

1. A signal generator comprising:
a clock generator comprising a first direct digital synthesizer (DDS) configured to produce a clock signal based on a clock source signal, and
a clock divider in communication with the clock generator, the clock divider comprising a second DDS, wherein the clock divider is configured to produce a divided signal based on (1) the clock signal and (2) a control signal indicating a divide ratio; and
a plurality of selectable filters in communication with the clock divider, the plurality of selectable filters being configured to produce a filtered signal based on the divided signal,
wherein a selection among the plurality of selectable filters is based on the divide ratio.

2. The signal generator according to claim 1, wherein the clock generator includes a frequency translator in communication with the clock divider and configured to produce a translated signal based on the clock signal.

3. The signal generator according to claim 2, wherein the frequency translator includes a mixer.

4. The signal generator according to claim 2, wherein the frequency translator includes a mixer having a local oscillator input, and wherein the mixer is configured to receive at the local oscillator input a signal based on the clock source signal.

5. The signal generator according to claim 1, further comprising a frequency translator in communication with at least one of the plurality of selectable filters and configured to produce a translated signal based on the filtered signal.

6. The signal generator according to claim 1, wherein the divide ratio is at least two and less than three.

7. The signal generator according to claim 1, in which the selection among the plurality of selectable filters is based on a user-selected frequency.

8. The signal generator according to claim 1, in which the plurality of selectable filters includes a 1/N-octave-band filter bank, where N is an integer greater than zero.

9. The signal generator according to claim 1, in which at least two among the plurality of selectable filters have different bandwidths.

10. A signal generator comprising:
a clock generator comprising a first direct digital synthesizer (DDS) configured to produce a clock signal based on a clock source signal;
a clock divider in communication with the clock generator, the clock divider comprising a second DDS configured to produce a divided signal based on (1) the clock signal and (2) a control signal indicating a divide ratio, and a third DDS configured to produce a second divided signal based on (1) the clock signal and (2) a second control signal indicating a second divide ratio; and
a plurality of selectable filters in communication with the clock divider, the plurality of selectable filters being configured to produce a filtered signal based on the divided signal,
wherein a selection among the plurality of selectable filters is based on the divide ratio.

11. A signal generator comprising:
a clock generator comprising a first direct digital synthesizer (DDS) configured to produce a clock signal based on a clock source signal;
a clock divider in communication with the clock generator, the clock divider comprising a second DDS, wherein the clock divider is configured to produce a divided signal based on (1) the clock signal and (2) a control signal indicating a divide ratio;
a second clock divider in communication with the clock divider, the second clock divider comprising a third DDS, wherein the second clock divider is configured to produce a divided signal based on (1) the filtered signal and (2) a second control signal indicating a second divide ratio; and
a plurality of selectable filters in communication with the clock divider, the plurality of selectable filters being configured to produce a filtered signal based on the divided signal,
wherein a selection among the plurality of selectable filters is based on the divide ratio.

12. A signal generator comprising:
a tunable clock generator configured to produce a clock signal, and
a clock divider in communication with the tunable clock generator, the clock divider comprising a direct digital synthesizer, wherein the clock divider is configured to produce a divided signal based on (1) the clock signal and (2) a control signal indicating a divide ratio; and
a plurality of selectable filters in communication with the clock divider, the plurality of selectable filters being configured to produce a filtered signal based on the divided signal,
wherein a selection among the plurality of selectable filters is based on the divide ratio.

13. A signal generator comprising:
a tunable clock generator configured to produce a clock signal;
a clock divider in communication with the tunable clock generator, the clock divider comprising a direct digital synthesizer, wherein the clock divider is configured to produce a divided signal based on (1) the clock signal and (2) a control signal indicating a divide ratio;
a second clock divider in communication with the tunable clock generator and configured to produce a second divided signal based on the clock signal, wherein the second clock divider comprises a direct digital synthesizer and is configured to produce the second divided signal based on a second control signal indicating a second divide ratio; and a plurality of selectable filters in communication with the clock divider, the plurality of selectable filters being configured to produce a filtered signal based on the divided signal, wherein a selection among the plurality of selectable filters is based on the divide ratio.

14. The signal generator according to claim 13, wherein the plurality of selectable filters is in communication with the second clock divider.

15. The signal generator according to claim 13, further comprising a switch in communication with the clock divider and the second divider and configured to select one among the divided and second divided signals.

16. The signal generator according to claim 13, wherein at least one among the clock divider and the second clock divider includes a frequency translator.

17. The signal generator according to claim 16, wherein at least one frequency translator is a mixer.

18. The signal generator according to claim 13, wherein the tunable clock generator includes a direct digital synthesizer.

19. The signal generator according to claim 13, wherein at least one direct digital synthesizer is preconfigured to output the respective divided signal at a defined frequency in response to receiving the clock source signal.

20. A method of signal generation, said method comprising:

receiving a request indicating a frequency;

determining a divide ratio based on the indicated frequency and a frequency of a clock source signal;

generating a control signal corresponding to the divide ratio;

based on the divide ratio, selecting a bandpass filter from a set of filters;

based on the control signal, producing an output signal having a principal component at the indicated frequency; and filtering the output signal with the selected bandpass filter to pass the principal component.

21. The method of signal generation according to claim 20, wherein producing an output signal includes providing the control word and a signal based on the clock source signal to a direct digital synthesizer (DDS).

22. The method of signal generation according to claim 20, wherein producing an output signal includes dividing a signal based on the clock source signal by a ratio of at least two but less than three.

23. The method of signal generation according to claim 20, wherein producing an output signal includes dividing a signal based on the clock source signal by a ratio of two-and-one-half.

24. A method of generating a signal, said method comprising:

using a direct digital synthesizer (DDS) to generate an output signal having a desired frequency component and a spurious frequency component;

monitoring a strength of the spurious frequency component; and changing a phase offset value of the DDS based on a result of said monitoring.

* * * * *